US 8,761,323 B2

(12) United States Patent
Wang et al.

(10) Patent No.: US 8,761,323 B2
(45) Date of Patent: Jun. 24, 2014

(54) IMPAIRMENT COVARIANCE AND COMBINING WEIGHT UPDATES DURING ITERATIVE TURBO INTERFERENCE CANCELLATION RECEPTION

(75) Inventors: Yi-Pin Eric Wang, Fremont, CA (US); Gregory Bottomley, Cary, NC (US); Jung-Fu Cheng, Fremont, CA (US); Stephen Grant, Pleasanton, CA (US); Ning He, Sollentuna (SE); Niklas Johansson, Uppsala (SE); Cagatay Konuskan, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 193 days.

(21) Appl. No.: 13/333,478

(22) Filed: Dec. 21, 2011

(65) Prior Publication Data
US 2013/0077670 A1 Mar. 28, 2013

Related U.S. Application Data

(60) Provisional application No. 61/540,144, filed on Sep. 28, 2011.

(51) Int. Cl.
*H04B 1/10* (2006.01)
(52) U.S. Cl.
USPC ........... 375/349; 375/148; 375/147; 375/150; 375/144; 375/142; 375/260; 375/267; 375/278; 375/346; 375/347; 375/348
(58) Field of Classification Search
USPC ......... 375/349, 260, 267, 278, 346, 347, 348, 375/148, 147, 150, 144, 142
See application file for complete search history.

(56) References Cited

U.S. PATENT DOCUMENTS

| 6,363,103 | B1 | 3/2002 | Buehrer et al. |
| 6,667,964 | B1 | 12/2003 | Seki et al. |
| 6,683,924 | B1 | 1/2004 | Ottosson et al. |
| 6,922,434 | B2 | 7/2005 | Wang et al. |
| 2001/0028677 | A1 | 10/2001 | Wang et al. |
| 2005/0195889 | A1 | 9/2005 | Grant et al. |
| 2005/0201447 | A1* | 9/2005 | Cairns et al. ............ 375/148 |
| 2005/0249269 | A1* | 11/2005 | Tomasin et al. .......... 375/148 |
| 2006/0251156 | A1 | 11/2006 | Grant et al. |

(Continued)

FOREIGN PATENT DOCUMENTS

| EP | 1233565 A2 | 8/2002 |
| EP | 1259001 A1 | 11/2002 |

(Continued)

OTHER PUBLICATIONS

International Search Report and Written Opinion in International Application No. PCT/SE2012/050638 dated Apr. 23, 2013 (17 pages total).

(Continued)

Primary Examiner — Kabir A Timory
(74) Attorney, Agent, or Firm — Nixon & Vanderhye, P.C.

(57) ABSTRACT

In a receive node of a wireless network, an iterative multi-user multi-stage interference cancellation receiver is used. After each stage of interference cancellation, interference characteristics change. An adaptive strategy is used in which after each stage of interference cancellation, impairment covariance is parametrically updated and combining weights of the receiver are adapted to reflect the updated impairment covariance.

38 Claims, 29 Drawing Sheets

(56) References Cited

U.S. PATENT DOCUMENTS

| | | | |
|---|---|---|---|
| 2006/0268962 A1 | 11/2006 | Cairns et al. | |
| 2007/0147329 A1 | 6/2007 | Soriaga et al. | |
| 2007/0147481 A1 | 6/2007 | Bottomley et al. | |
| 2008/0063033 A1* | 3/2008 | Khayrallah | 375/148 |
| 2008/0130719 A1 | 6/2008 | Bottomley et al. | |
| 2008/0304554 A1 | 12/2008 | Fulghum et al. | |
| 2009/0186645 A1 | 7/2009 | Jaturong et al. | |
| 2009/0257477 A1 | 10/2009 | Khayrallah et al. | |
| 2011/0222618 A1 | 9/2011 | Huss et al. | |

FOREIGN PATENT DOCUMENTS

| | | |
|---|---|---|
| WO | 02080432 A2 | 10/2002 |
| WO | 2006-030314 A1 | 3/2006 |
| WO | 2007-051111 A1 | 5/2007 |

OTHER PUBLICATIONS

Kim-Chyan Gan, "Maximum Ratio Combining for a WCDMA Rake Receiver", Freescale Semiconductor Application Note, Rev. 2, Nov. 2004 (8 pages total).

International Search Report and Written Opinion in International Application No. PCT/SE2012/051032 dated Apr. 26, 2013 (17 pages total).

R1-090919, TSG-RAN WG1 #56, "Performance prediction of turbo-SIC receivers for system-level simulations", Orange, Nokia, Nokia Siemens Networks, Texas Instruments, Athens, Greece, Feb. 9-13, 2009 (11 pages).

Office Action dated Jun. 21, 2013 in related U.S. Appl. No. 13/402,297 (7 pages).

International Search Report and Written Opinion mailed Sep. 9, 2013 in corresponding International Application No. PCT/SE2012/050920 (15 pages total).

Office Action dated Oct. 9, 2013 in related U.S. Appl. No. 13/333,703 (12 pages).

International Preliminary Report on Patentability w/transmittal in International Application No. PCT/SE2012/051032 dated Apr. 10, 2014 (13 pages total).

* cited by examiner

IMPAIRMENT COVARIANCE AND COMBINING WEIGHT UPDATES DURING ITERATIVE TURBO INTERFERENCE CANCELLATION RECEPTION

RELATED APPLICATION

This application may be related, at least in part, to United States patent application 13/333,703, entitled "FINGER PLACEMENT IN MULTI-STAGE INTERFERENCE CANCELLATION" (companion application) filed Dec. 21, 2011, which is incorporated herein by reference in its entirety. This application also claims priority and benefit of U.S. provisional application 61/540,144 entitled "MULTI-STATE TURBO EQUALIZATION AND INTERFERENCE CANCELLATION RECEIVER FOR WIRELESS SYSTEMS" filed on Sep. 28, 2011, which is incorporated herein by reference in its entirety.

TECHNICAL FIELD

Technical field of present disclosure relates to updating impairment covariance and combining weights during iterative turbo interference cancellation reception.

BACKGROUND

In a turbo interference cancellation receiver, interference such as inter-symbol-interference (ISI), code-division multiplexing (CDM) interference, and spatial-multiplexing interference due to single-user (SU) or multi-user (MU) MIMO can be cancelled based on soft estimates of the interfering symbols. The soft symbol estimates are formed using the decoder outputs, which describe the likelihood ratios of the bits that are used to determine these interfering symbols. Each likelihood ratio can be converted to bit probability (i.e., probability of bit having value 0 or 1). After cancellation, the received signal is re-equalized using new combining weights, which reflect a new impairment covariance matrix due to interference cancellation. The equalized symbols are demodulated and converted to bit soft values, which are used by the various decoders, one for each user, codeword or MIMO stream, to produce updated bit likelihood ratios. This iterative process of cancellation, equalization, demodulation, and decoding is referred to as turbo interference cancellation (turbo-IC).

One key aspect of turbo-IC implementation is adapting the equalizer formulation to the residual impairment characteristics. In some radio base stations (RBSs), despread-level equalization such as G-Rake or G-Rake+ is used. The received signal is descrambled and despread for a symbol of interest and for a number of finger delays. The multiple despread values are combined according to a set of combining weights, which is dependent on the impairment covariance matrix. In the G-Rake approach, an estimate of the code-averaged impairment covariance matrix is obtained by parametrically formulating a self-interference covariance matrix using the estimated own-signal propagation characteristics while interference from other interfering signals and thermal noise is modeled as additive white Gaussian noise (AWGN). In the G-Rake+ approach, an estimate of the code-averaged impairment covariance matrix can be obtained by observing the despread values on one or more unoccupied codes. Previous studies have confirmed that such a practical approach captures the overall interference characteristics more accurately and results in good performance relative to a G-Rake+ receiver that has perfect knowledge about the impairment covariance matrix. Another commonly used receiver in a CDMA system is Rake receiver which models overall interference as AWGN.

Finger delays (or finger placement) and combining weights are two important design parameters for a G-Rake+ equalizer. In a practical iterative multi-stage interference-cancellation based multiuser detector (MUD), or turbo-IC receiver, interference characteristics can change as a portion of the interference is cancelled. It would thus be desirable to update covariance estimates and combining weights.

SUMMARY

A non-limiting aspect of the disclosed subject matter is directed to a method performed in a receive node of a communication network to perform a first stage processing a symbol of interest contained in a first composite signal, and to perform a second stage processing the same symbol of interest contained in a second composite signal. The first stage processing comprises determining a first stage impairment covariance estimate, determining one or more first stage combining weights based on the first stage impairment covariance estimate, performing a first stage equalization of the first composite signal based on the first stage combining weights to generate a first stage equalized signal, determining one or more first stage interfering symbol estimates based on the first stage equalized signal, and canceling the first stage interfering symbol estimates from the first composite signal to generate an interference-reduced version of the first composite signal. The second stage processing comprises determining a second stage impairment covariance estimate based on the first stage impairment covariance estimate and one or more previous stage interfering symbol estimates, determining one or more second stage combining weights based on the second stage impairment covariance estimate, and performing a second stage equalization of the second composite signal based on the second stage combining weights to generate a second stage equalized signal. The second composite signal is based on the interference-reduced version of the first composite signal, and the previous stage corresponds to the first stage processing or to a previous run of the second stage processing.

Another non-limiting aspect of the disclosed subject matter is directed to a receiver of a receive node of a communication network. The receiver comprises a plurality of chains, in which each chain is structured to process a symbol of interest contained in a first composite signal in a first stage, and to process the same symbol of interest contained in a second composite signal in a second stage. Each chain of the receiver comprises an equalizer, a demodulator, a signal regenerator, and an interference canceller. In the first stage, the equalizer is structured to determine a first stage impairment covariance estimate, to determine one or more first stage combining weights based on the first stage impairment covariance estimate, and to perform a first stage equalization of the first composite signal based on the first stage combining weights to generate a first stage equalized signal. The demodulator is structured to demodulate the first equalized signal to generate a first stage demodulated data. The signal regenerator is structured to determine one or more first stage interfering symbol estimates based on the first stage demodulated data. The interference canceller is structured to cancel the first stage interfering symbol estimates from the first composite signal to generate an interference-reduced version of the first composite signal. In the second stage, the equalizer is structured to determine a second stage impairment covariance estimate based on the first stage impairment covariance estimate and one or more previous stage interfering symbol estimates, to determine one or more second stage combining weights based on the second stage impairment covariance estimate, and to perform a second stage equalization of the second composite signal based on the second stage combining weights to generate a second stage equalized signal. The second composite signal is based on the interference-reduced version of the first composite signal, and the previous stage corresponds to the first stage processing or to a previous run of the second stage processing.

Yet another non-limiting aspect of the disclosed subject matter is directed to a non-transitory computer storage medium which has stored therein programming instructions. When a computer executes the programming instructions, the computer executes the method performed in the receive node as described above.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
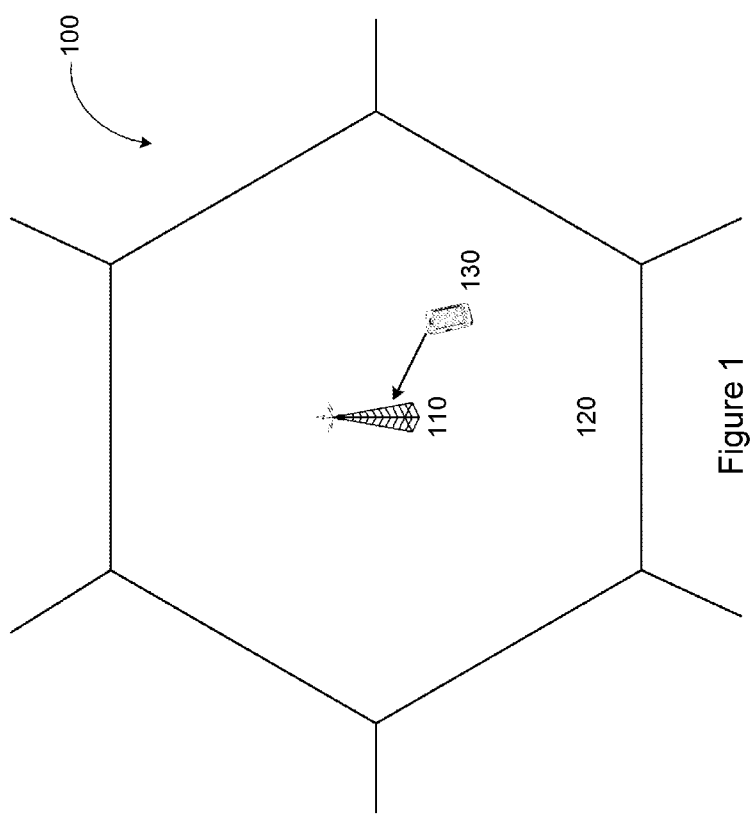
FIG. 1 illustrates an example scenario of a wireless network in which mobile terminals and base station communicate with each other.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, HSPA—are used as examples for explanation purposes. Note that the technology described herein can be applied to non-3GPP standards. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

FIG. 1 illustrates an example scenario of a wireless network 100 in which a mobile terminal 130 and a base station 110 (corresponding to cell 120) communicate with each other. In the downlink, the base station 110 is a transmit node and the mobile terminal 130 is a receive node. In uplink, the situation is reversed. For simplicity, one mobile terminal 130 and one base station 110 are shown. However, this should not be taken to be limiting. The concepts discussed can be expanded and applied to networks with multiple base stations and mobile terminals.

Figure 2:
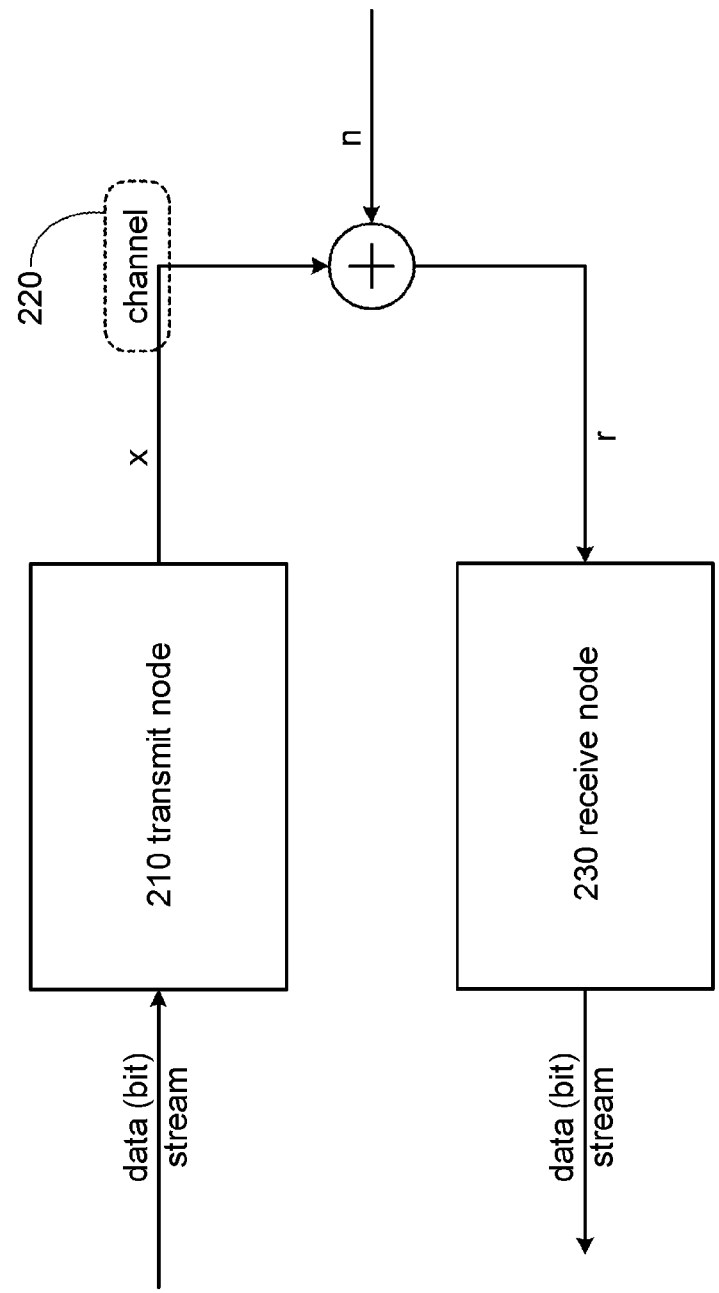
FIG. 2 illustrates a simplified block diagram of a communication link between a transmit node and a receive node.

FIG. 2 is a simplified block diagram of a communication link between a transmit node 210 and a receive node 230. The transmit node 210 performs operations on the data stream, which can be a stream of bits, to transmit a corresponding signal x through a channel 220. While it is recognized that the signal x transmitted from the transmit node 210 is carried by RF carriers, for the purposes of this discussion, equivalent baseband signaling is assumed. Thus, it can be said that baseband signal x is transmitted from the transmit node 210 through the channel 220 which can be dispersive, non-dispersive, frequency-selective, or frequency-flat. The signal r received at the receive node 230 through the channel 220 is a composite of some version of the transmitted signal x and noise n. That is, the received signal r can be expressed as follows:

$$r = \hat{x} + n \qquad (1)$$

where $\hat{x}$ represents a version of the transmitted signal x received at the receive node 230. The noise n can be viewed as including any unwanted signals including interferences (from other cells, mobile stations, thermal noise, etc.) as well as interferences described above.

The receive node 230 is structured to perform enhancement processing on the received signal r to increase the effective SINR of the communication link between transmit node 210 and the receive node 230. Generally, enhancement processing can be viewed as amplifying the transmitted signal x and/or reducing the noise n. The receive node 230 reproduces the data (bit) stream originally supplied to the transmit node 210.

As noted before, in an iterative multi-stage interference-cancellation, the interference characteristics can change as a portion of the interference is cancelled. Interference may be characterized by its correlation function, or by the residual interference power levels, each associated with an interfering signal. It can be important to adapt the equalization weights according to the updated interference characteristics within each detection stage. As such, impairment covariance update can play an important role.

However, the inventors are not aware of any solutions for impairment covariance update in a practical iterative multi-stage soft cancellation based multiuser detector (MUD). It is also desirable for any MUD type of solution to consider soft ISI cancellation, which is an important feature of turbo-IC.

In U.S. Patent Publication 2010/0020854 ('854 Publication), which is incorporated herein in its entirety by reference, parametric update applied to a non-parametrically obtained overall impairment covariance estimate is used to form a partial impairment covariance estimate for a multiple-symbol joint detector. The partial impairment covariance estimate excludes contribution from a number of symbols which are jointly detected. The partial impairment covariance estimate is used in a pre-equalization stage to suppress interference.

The solution in the '854 Publication however does not apply to an iterative multi-stage interference cancellation receiver.

U.S. Patent Publication 2008/0130719 ('719 Publication), which is incorporated herein in its entirety by reference, also describes an approach to modify a non-parametrically obtained overall impairment covariance estimate using channel estimates and hypothesized MIMO transmission configurations. However, like the '854 Publication, the '719 Publication does not address adapting the parametric modification to changing residual interference in an iterative multi-stage interference cancellation receiver.

As indicated above, a key aspect of turbo-IC implementation is adapting the equalizer formulation to the residual impairment characteristics during each stage, and that a despread-level equalization such as G-Rake+ can be used in which the received signal is descrambled and despread for a symbol of interest and for a number of finger placements.

Finger placement for a G-Rake receiver is described in U.S. Pat. No. 6,683,924 which is herein incorporated by reference in its entirety. G-Rake fingers can include energy-collecting and interference-suppressing fingers. The energy-collecting fingers can be determined by multipath delays, whereas the interference-suppressing fingers can be determined by the delays of the energy-collecting fingers as well as the delay differentials of the multipaths. The interference-suppressing fingers can be determined by impairment correlations. A first set of fingers can be used to measure impairment correlation. A delay can be chosen as an interference-suppressing finger when the impairment correlation between such a delay and that of an already chosen finger (energy-collecting or interference-suppressing) is high.

Finger placements (or finger delays) and combining weights are important design parameters for an equalizer such as the G-Rake or G-Rake+ equalizer. Since the interference characteristics can change as a portion of the interference is cancelled in an interference cancellation stage, it would be desirable to adapt the finger placements and/or combining weights to the different residual impairment characteristics during different stages of the turbo-IC receiver.

In one aspect of the disclosed subject matter, a total impairment covariance estimate is obtained during a first turbo-IC stage, before any soft symbol cancellation takes place. This total impairment covariance estimate can be based on unoccupied codes despread values. In a subsequent turbo-IC stage, a parametric update is applied.

The parametric update can be formed based on the level of residual interference and channel response associated with a first interfering signal. The parametric update can be formed also based on the level of residual interference and channel response associated with a second interfering signal. The levels of residual interference of the first and second signals can be determined by the outputs of the decoders that process the codewords associated with the first and second signals, respectively. The updated impairment covariance estimate can be used to form the G-Rake+ combining weights.

Note that one or more aspects described herein may be applied to any other iterative, multi-stage interference cancellation (IC) schemes with G-Rake+ equalization, such as iterative hard or soft pre-decoding IC for which the regenerated signal for cancellation is based on symbol estimates from the demodulator instead of the channel decoder. In addition, one or more aspects can be applied to iterative, multi-stage hard post-decoding interference cancellation when the regenerated signal for cancellation is based on symbol estimates from re-encoding the binary decoded information bits after the decoded information bits pass the cyclic redundancy check (CRC).

Figure 3A:
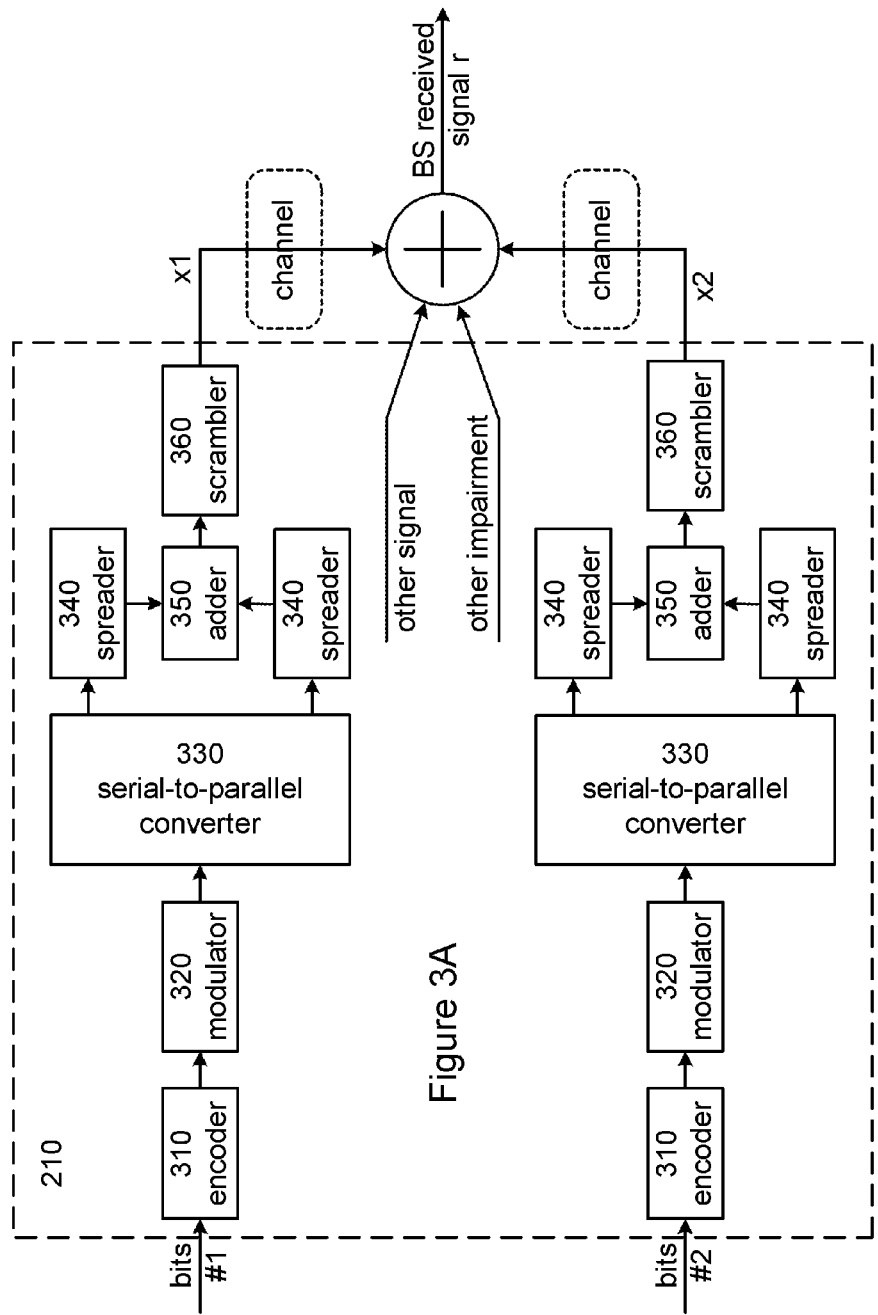
FIGS. 3A and 3B illustrate example diagrams representing models of a WCDMA/HSPA uplink transmission and reception.

For a discussion regarding the update strategy, a block diagram representing a model of a WCDMA/HSPA uplink transmission and reception illustrated in FIG. 3A is used. In this instance, the mobile terminal 130 is the transmit node and the base station 110 is the receive node. This also should not be taken to be limiting. In the downlink direction, it is contemplated that some or all mobile terminals 130 may also perform signal enhancement processing to which one or more aspects of the disclosed subject matter are applicable.

The model illustrated in FIG. 3A may be viewed to as a being an instance of the transmit node 210 shown in FIG. 2. In FIG. 3A, information bits of a first signal (labeled "bits #1") are encoded by an encoder 310 to produce encoded bits according to a forward-error-correcting (FEC) code, which are modulated by a modulator 320 to produce transmitted symbols. For ease of reference, the information bits of the first signal (bits #1) will be referred to as the first information stream. Then it can be said that the encoder 310 encodes the first information stream to produce a first encoded information stream, which is modulated by the modulator 320 to produce a first symbol stream. The first symbol stream is mapped by a serial-to-parallel converter 330 to one or multiple channelization codes. FIG. 3A illustrates a case of transmitting two channelization codes for the first symbol stream. However, the number of channelization codes can be one or more than one.

Figure 3B:
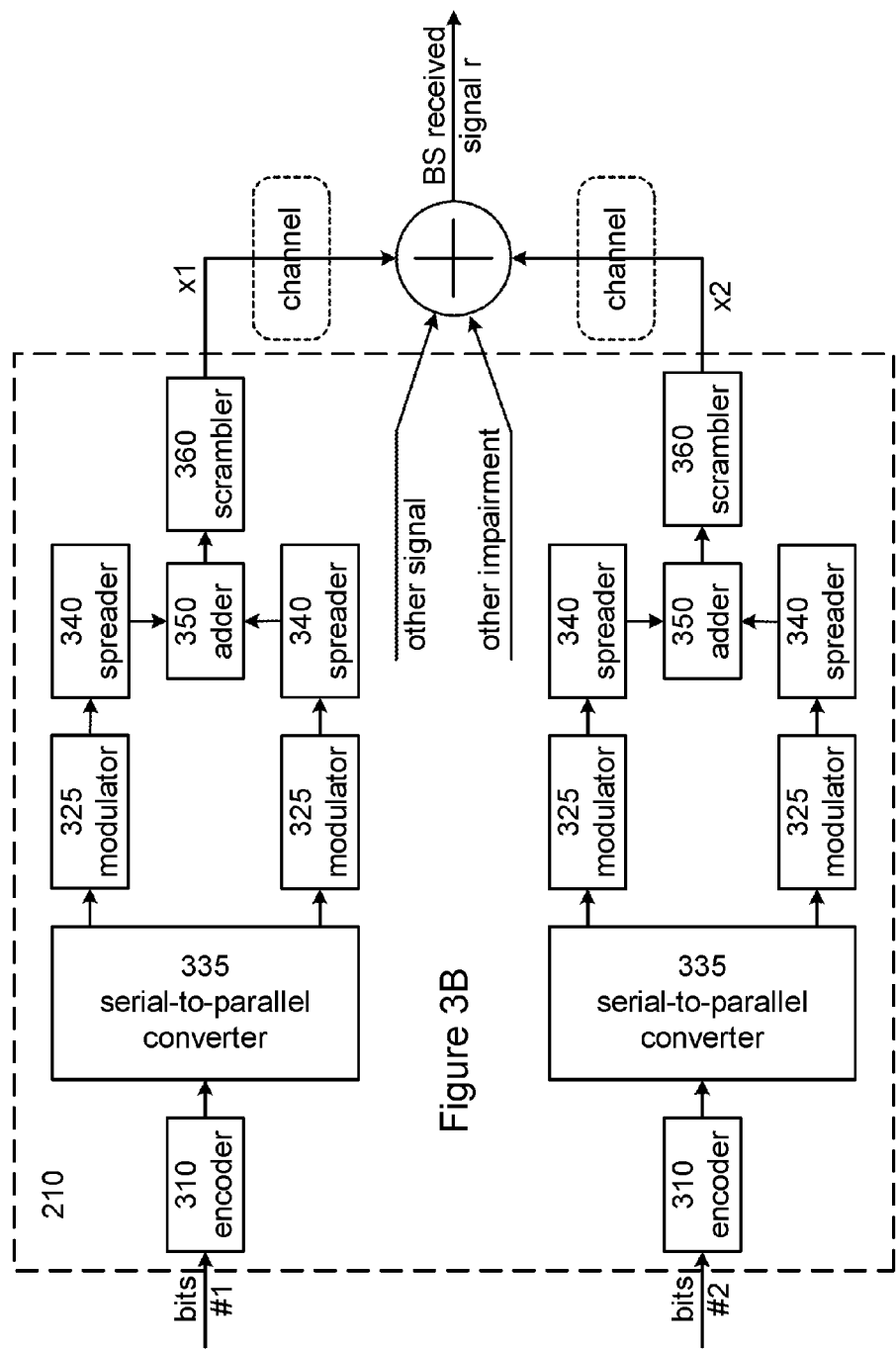

FIG. 3A shows that modulation takes place before the serial-to-parallel operation splits the symbol stream into multiple symbol streams for multi-code transmission. But as shown in FIG. 3B, an alternative implementation is to have the serial-to-parallel operation by the serial-to-parallel converter 335 directly follow the encoder 310 to split the single bit stream into multiple ones, each processed by a modulator 325 to produce a corresponding symbol stream. Each symbol stream is spread using one of the channelization codes.

In FIGS. 3A and 3B, the transmitted symbols in the first symbol stream are separately spread by spreaders 340 on each of the channelization codes to produce spread signals corresponding to the channelization codes, and an adder 350 sums the spread signals produced by the spreaders 340. The summed spread signals from the adder 350 are scrambled by a scrambler 360 to produce a first signal $x_1$ which is transmitted. In practice, other data and control channels are mapped on additional channelization codes. But for the purposes of this discussion and without loss of generality, these signals are omitted.

The first transmitted signal $x_1$ is sent through a radio channel to the receive node 230 (e.g., a base station). The channel may be dispersive. FIGS. 3A and 3B also show a second signal $x_2$, generated in a similar fashion to the first signal $x_1$ as being transmitted to the receive node 230. The signals $x_1$ and $x_2$ can be transmitted from the same user, but via different transmit antennas in the case of SU-MIMO (with the same scrambling code), or from different users in the case of multi-user scheduling or MU-MIMO (with different scrambling codes). It should be noted that there can be more than two signals generated and transmitted to the receive node 230 and the concepts discussed herein can be generalized to any number of such generated signals. But for ease of explanation, only two are illustrated.

The base station receives a signal r, which includes some versions of $x_1$ and $x_2$ (denoted respectively as $\hat{x}_1$ and $\hat{x}_2$) along with other signals (e.g., control channels, low-rate data channels), and other impairments (other-cell interference, thermal noise). That is, the signal r received at the base station can be expressed as follows:

$$r = \hat{x}_1 + \hat{x}_2 + n \quad (2)$$

Again, the noise signal n can be viewed as including any unwanted signals including interferences. Just as an aside, the received signal r can be generally expressed as follows:

$$r = \sum_{k=1}^{m} \hat{x}_k + n \quad (3)$$

where m represents the number of signals transmitted to the receive node 230.

Figure 4:
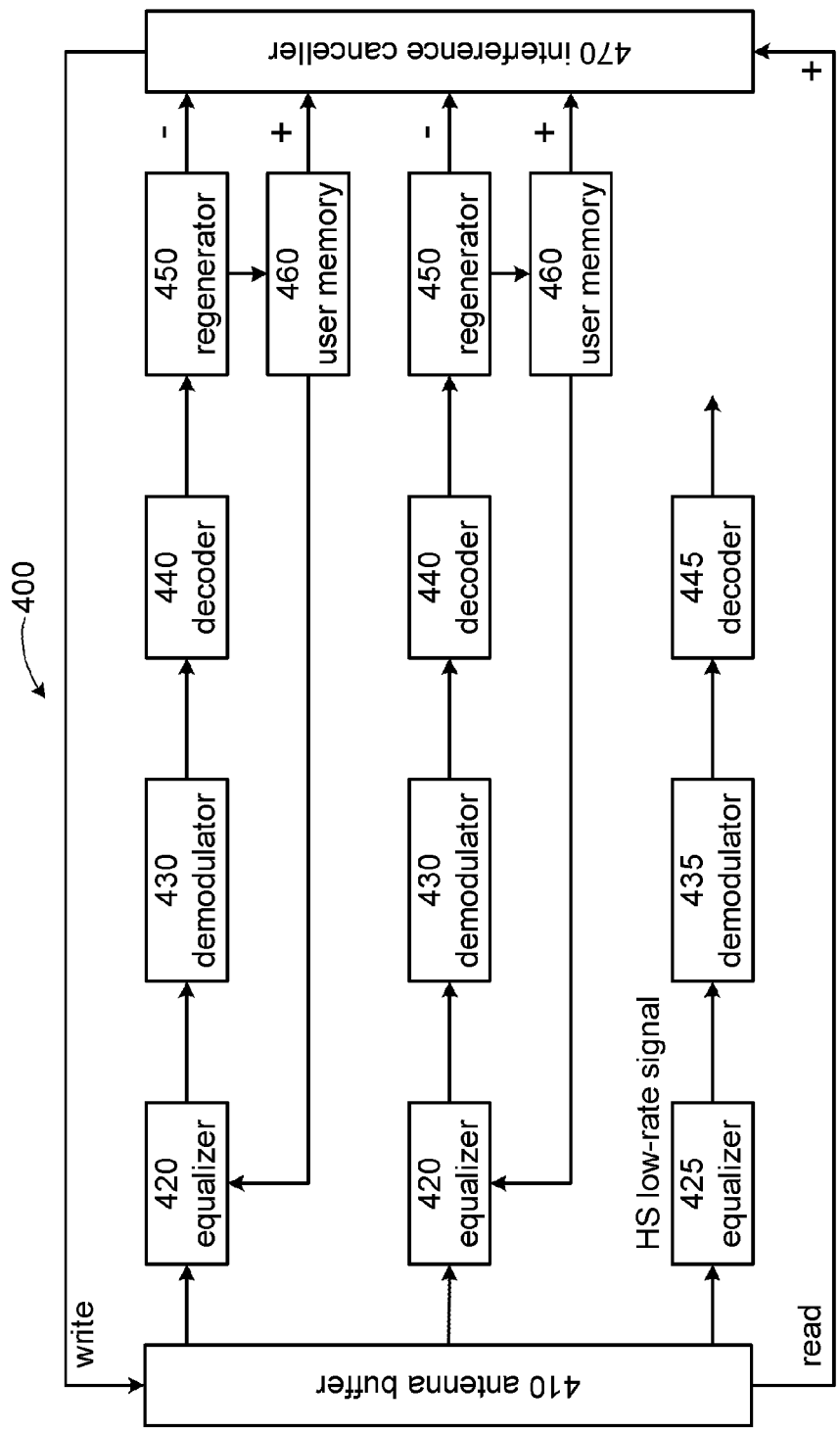
FIG. 4 illustrates an example embodiment of an iterative receiver.

A high-level architecture of an example turbo-IC receiver 400 capable of recovering the information bits from the first and second signals generated in FIG. 3 is shown in FIG. 4. For brevity, the turbo-IC receiver 400 will simply be referred to as the "receiver" 400. The receiver 400 comprises an antenna buffer 410 structured to store the received signal at the first stage or interference reduced version of the received signal at later stages, one or more equalizers 420 structured to equalize signals from the antenna buffer 410, one or more demodulators 430 structured to demodulate the equalized signals, one or more decoders 440 structured to decode the demodulated signals, one or more signal regenerators 450 structured to regenerate signals, one or more user memories 460 structured to store the regenerated signals and/or symbols of different stages, and an interference canceller 470 structured to cancel interferences in each stage. The receiver 400 can also include an equalizer 425, a demodulator 435 and a decoder 445 to process WCDMA/HSPA low-rate signals. These can be same or different from the equalizers 420, the demodulators 430 and the decoders 440. It should be noted that actuality, these can be any signals that are not processed in an iterative manner. As such, they can be of any rate, not just low rate. But for ease of reference, they are referred to as "HS low-rate signal" in the Figures.

The receiver 400 can be viewed as being included in the receive node 230 illustrated in FIG. 2. In the uplink transmission, the receiver 400 can be a receiver of a base station, and in the downlink transmission, it can be a receiver of a mobile terminal. As expressed in equation (2) above, the receive node 230 receives a signal r which is a combination of signals as $\hat{x}_1$ and $\hat{x}_2$ (versions of originally transmitted first and second signals $x_1$ and $x_2$) plus other signals and impairments or a noise signal n.

In FIG. 4, two chains of equalizer 420, demodulator 430, decoder 440, signal regenerator 450 and user memory 460 are shown. In other words, the two signals $x_1$ and $x_2$ are detected in parallel. Each chain processes the received signal r for the signal of interest. For example, the signal of interest for the top chain (also referred to as the first chain) processes can be the first signal $x_1$, and the signal of interest for the second (middle) chain can be the second signal $x_2$. While two chains are shown, this is not a limitation. The number of chains can be any number.

For each signal of interest, e.g., the first signal $x_1$, the equalizer 420 equalizes the signal stored in the antenna buffer 410 (which can be the received signal r or the interference reduced version of the signal of interest) to produce a stream of equalized symbols in that signal of interest. For example, the first chain equalizer 420 in FIG. 4 produces a stream of equalized symbols corresponding to the first symbol stream produced by the top modulator 320 in FIG. 3A. Generally, the equalized symbols of the stream produced by the equalizer 420 can be viewed as estimates of the symbols in the symbol stream produced by a corresponding modulator 320. It can be said that from the perspective of a particular symbol of interest, the equalizer 420 equalizes that symbol. The equalizer 420 also equalizes other symbols in the same symbol stream (i.e., of the same signal) which can be sources of own signal interference. Symbol streams of other streams (i.e., of other signals) which are other interference sources to the symbol of interest are also equalized.

The demodulator 430 demodulates the equalized symbol to produce a demodulated data. In one example, this can be a number of encoded bit soft values corresponding to the symbol of interest. The decoder 440 decodes the demodulated data to produce likelihood indicators. For example, this can be a number of bit log-likelihood ratios (LLR) for each of the encoded bits. Other examples of the likelihood indicators include simple ratios and probability. It should be noted that any type of likelihood indications can suffice. The likelihood indicators from the decoder 440 are used by the signal regenerators 450 to obtain an estimate of the signal transmitted from the transmit node 210.

In FIG. 4, the outputs of the signal regenerators 450 of the two chains can be estimates of the first and second signals $x_1$ and $x_2$. The interference canceller 470 cancels the estimated signals from the total received signal, and the cleaned-up version of the received signal can be used in a subsequent stage of signal detection. In one aspect, interference canceller 470 reads the contents of the antenna buffer 410, cancels the interference, and writes the result back to the antenna buffer 410.

At any stage of interference cancellation, the interference canceller 470 cancels interferences from other detected signals, e.g., interferences of signals $x_1$ and $x_2$ from each other. Own signal interferences such as ISI are also cancelled. However, different interfering signals can have different levels of cancellation. The level of cancellation depends on the likelihood indicators such as the LLRs. If the LLRs have a high magnitude, indicating strong confidence, the level of cancellation is high. For example, the decoding of $x_1$ could result in a much stronger confidence (e.g., due to lower coding rate, higher received power, etc.) than that of $x_2$.

Figure 5A:
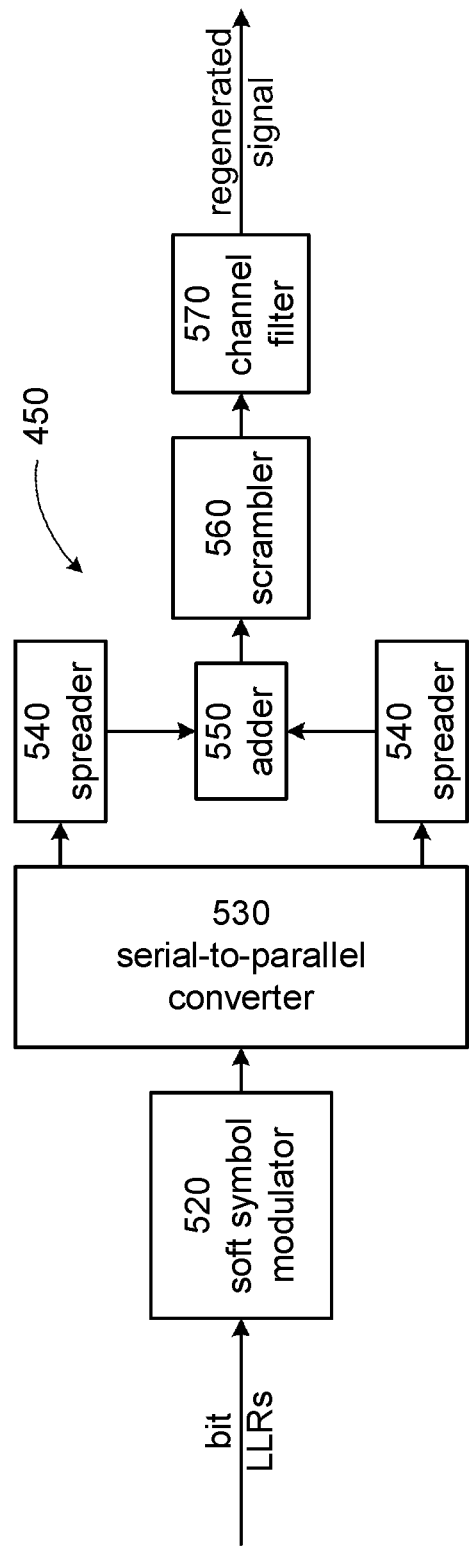
FIGS. 5A and 5B illustrate example embodiments of a signal regenerator (with soft symbol demodulator)
Figure 6A:
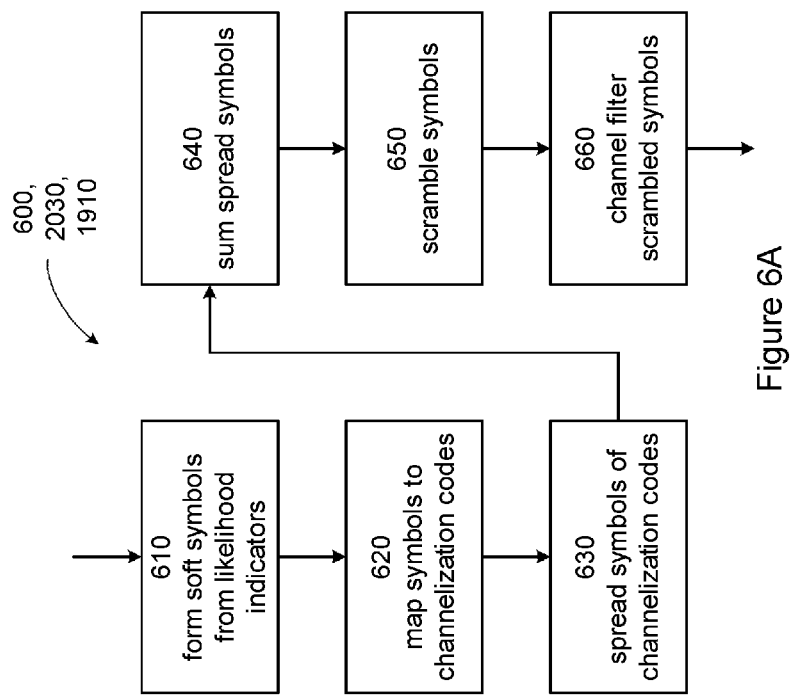
FIGS. 6A and 6B illustrate flow charts of example processes to regenerate an estimated signal (based on soft outputs of decoder)

An example architecture of the signal regenerator 450 is illustrated in FIG. 5A. The signal regenerator 450 comprises a soft modulator 520, a serial-to-parallel converter 530, one or more spreaders 540, an adder 550, a scrambler 560, and a channel filter 570. A flow chart of an example process performed by the signal regenerator 450 in FIG. 5A is illustrated in FIG. 6A.

For each symbol of interest, the soft modulator 520 in step 610 forms a soft symbol based on the likelihood indicators (e.g., LLRs) output by the decoder 440. The soft symbol can represent an estimate of the symbol of interest. The soft symbol can also represent an estimate of an interfering symbol. In one aspect, the soft modulator 520 formulates each soft symbol as a conditional mean based on the likelihood indicators (e.g., the bit LLRs) output by the decoder 440. The serial-to-parallel converter 530 maps the soft symbol into the channelization codes in step 620. Again, the number of channelization codes can be one or greater than one. The soft symbol is spread by spreaders 540 on each of the channelization codes in step 630, and the spread signals are summed together by the adder 550 in step 640, scrambled by the scrambler 560 in step 650, and channel-filtered by the channel filter 570 in step 660 to produce an estimate of the transmitted signal, e.g., an estimate of the signal $x_1$ or $x_2$. Of course, it is recognized that where there is only one channelization code, steps 620 and 640 need not be performed.

Figure 5B:
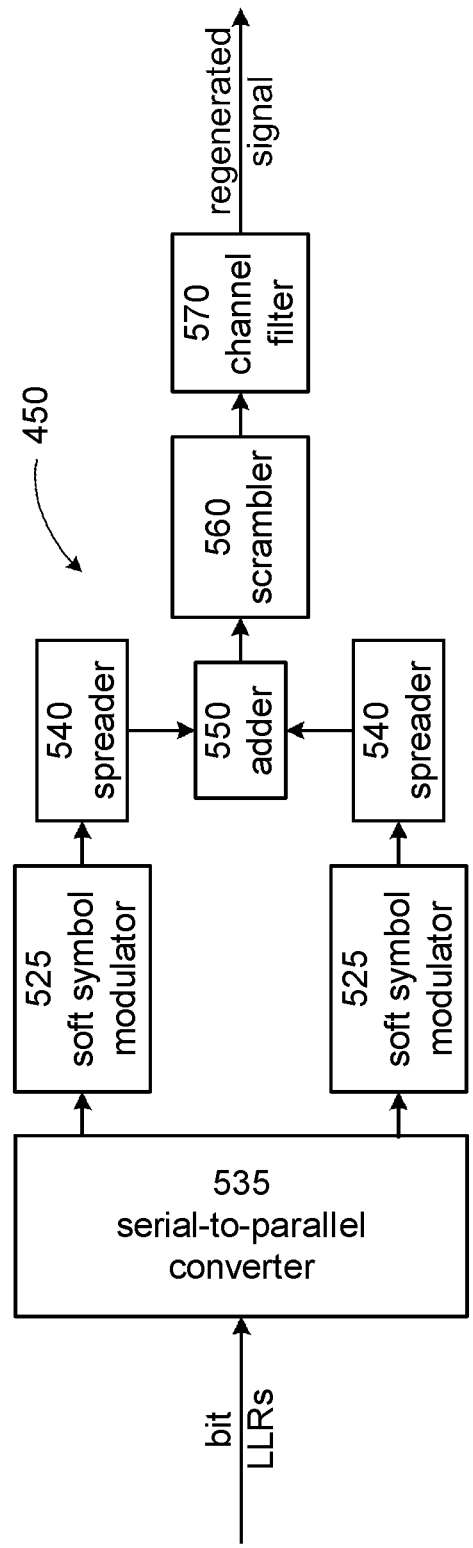

An alternative example architecture of the signal regenerator 450 is illustrated in FIG. 5B. Compared to FIG. 5A, the order of soft symbol modulation and serial-to-parallel processing are reversed. As seen, the signal regenerator 450 in FIG. 5B comprises a serial-to-parallel converter 535 and one or more soft modulators 525. Like FIG. 5A, the signal regenerator in FIG. 5B also includes one or more spreaders 540, an adder 550, a scrambler 560, and a channel filter 570.

Figure 6B:
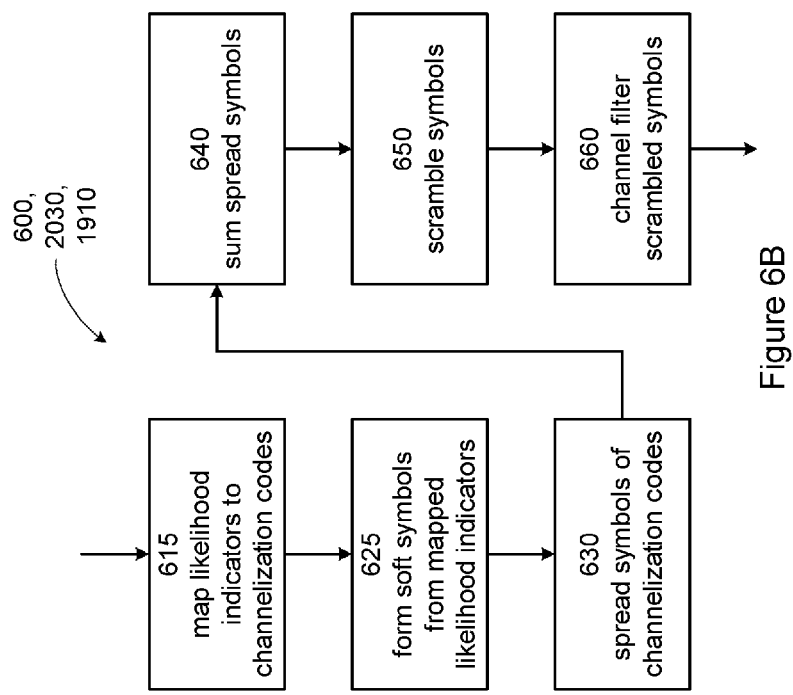

A flow chart of an example process performed by the signal regenerator 450 in FIG. 5B is illustrated in FIG. 6B. For each symbol of interest, the serial-to-parallel converter 535 maps the likelihood indicators from the decoder 440 into the channelization codes in step 615, the number of channelization codes being one or greater than one. The soft modulators 525 in step 625 form soft symbols based on the mapped likelihood indicators. The soft symbols together can represent an estimate of the symbol of interest or an estimate of an interfering symbol. Again, the soft modulators 525 can formulate the correspondingly mapped soft symbols as conditional means. The remaining steps are similar to the steps in FIG. 6A, and thus the details are not repeated. Of course, it is recognized that where there is only one channelization code, steps 615 and 640 need not be performed.

Note that the architecture of the signal regenerators 450 illustrated in FIGS. 5A and 5B are respectively similar to the transmit node models illustrated in FIGS. 3A and 3B. This is logical since it is preferable to generate the estimate of the signal in a way same or similar to the way in which the originally transmitted signal is generated. In one aspect, the correspondence between FIGS. 3A and 5A and between FIGS. 3B and 5B can be described as follows. The soft symbol modulators 520, 525 generate streams of soft symbols that are estimates of the corresponding streams of symbols generated by the modulators 320, 325. The soft symbols are used to regenerate an estimation of the signal of interest contained in the received signal. From the perspective of each symbol of interest, the soft symbol modulators 520, 525 generate an estimate of that symbol of interest and generate estimates of interfering symbols in the same symbol stream. Estimates of interfering symbols in different symbol streams are also generated.

The turbo-IC receiver architecture of FIG. 4 is advantageous as the same regenerated signal can be used for other-signal cancellation as well as own ISI cancellation. However, this approach can result in an over-cancellation, where part of the desired signal is also cancelled (the non-ISI portion of the signal). The over-cancellation can be corrected through a signal add-back process performed by the equalizer 420.

Figure 7:
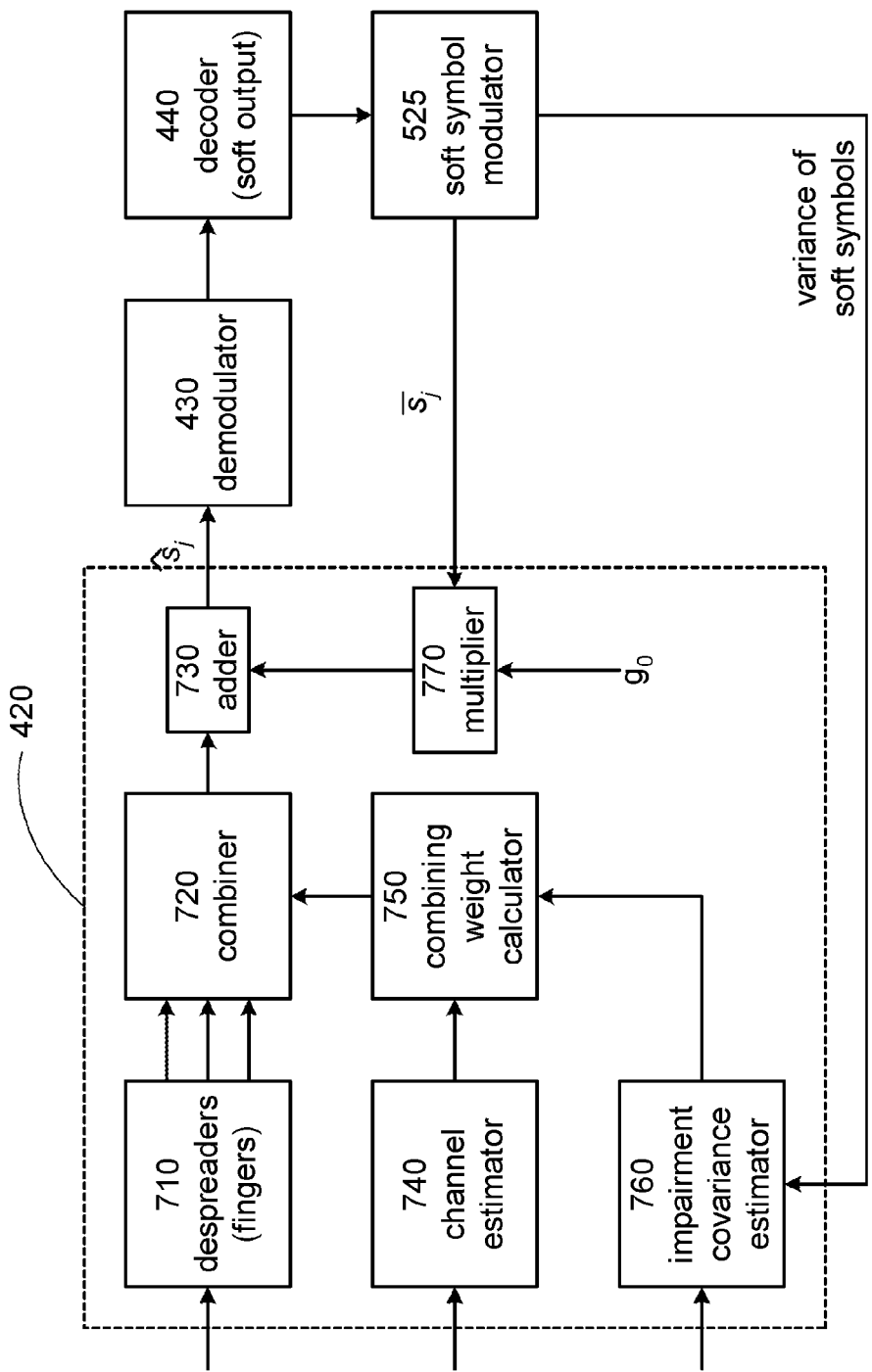
FIG. 7 illustrates an example embodiment of an equalizer adapted to perform a signal add-back process.

An example architecture of the equalizer 420 that can perform the signal add-back process is illustrated in FIG. 7. In this figure, a G-Rake+ equalizer is adapted to perform the signal add-back process, which can be performed during the G-Rake+ equalization. As shown, the soft symbol $\bar{s}$ is added back to form a fully equalized symbol $\hat{s}$. The scaling term $g_0$ is determined to ensure that the fully equalized symbols $\hat{s}$ is a MMSE and ML symbol estimate. An example of soft ISI cancellation using the decoder output LLRs is described in US Patent Publication 2007/0147481 ('481 Publication) incorporated by reference in its entirety herein.

Figure 8:
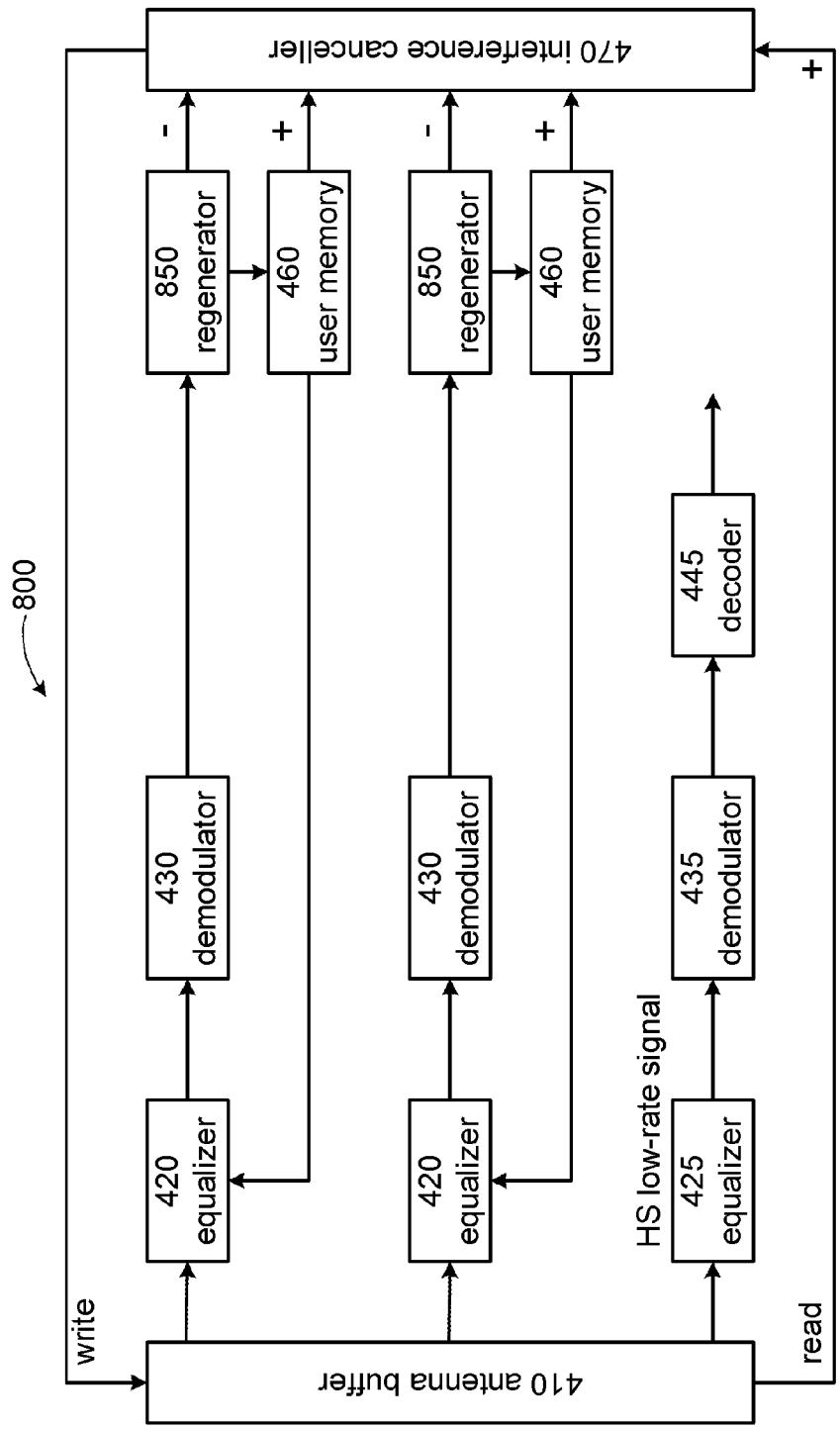
FIG. 8 illustrates another example embodiment of an iterative receiver.

A high-level architecture of another example turbo-IC receiver capable of recovering the information bits from the first and second signals is shown in FIG. 8. Note that the receiver 800 comprises components similar or identical to that of the receiver 400 such as the antenna buffer 410, equalizers 420, demodulators 430, user memories 460 and the interference canceller 470. The receiver 800 can perform iterative hard and/or soft pre-decoding interference cancellation based on the output of the demodulator 430. Thus, the decoder 440 need not be included in the receiver 800 for pre-decoding cancellation.

Figure 9A:
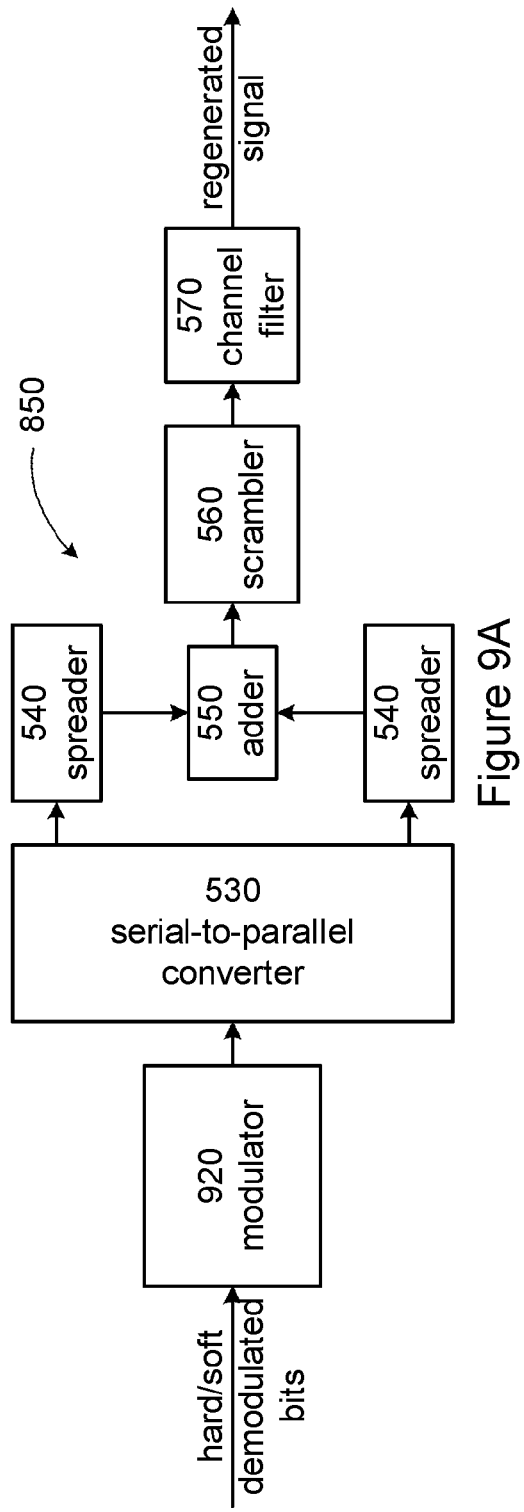
FIGS. 9A and 9B illustrate example embodiments of a signal regenerator (pre-decoding signal estimate generation)
Figure 9B:
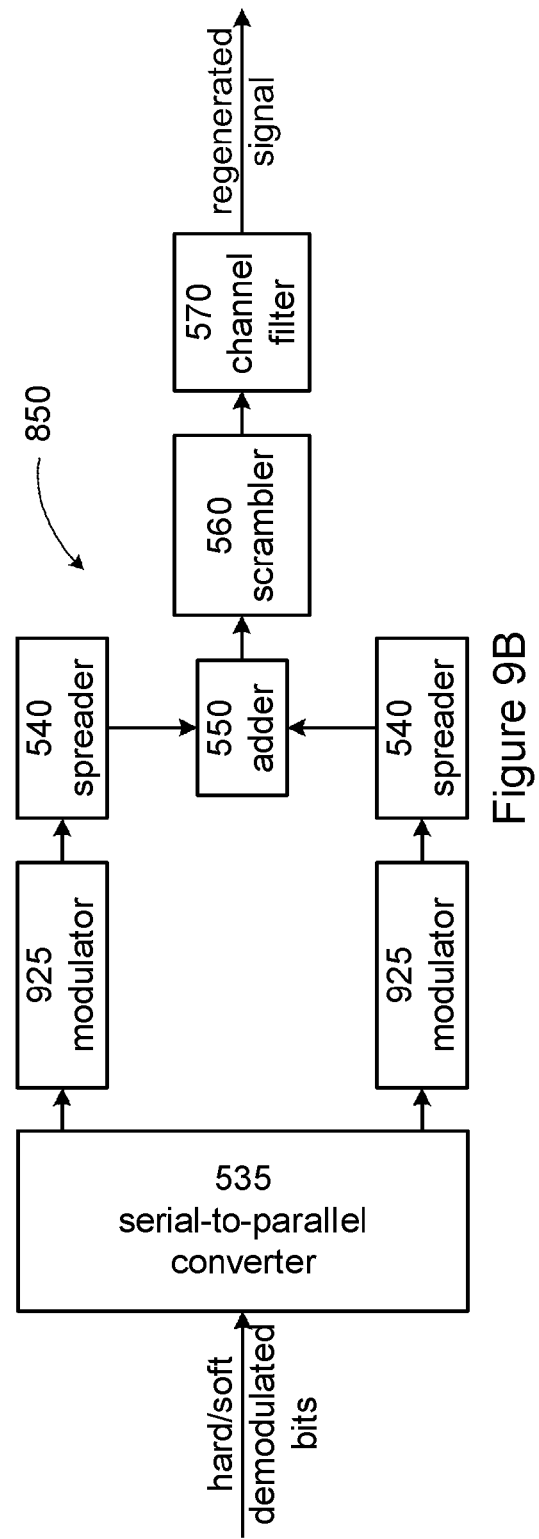

Example architectures of the signal regenerator 850 are illustrated in FIGS. 9A and 9B. As seen, the signal regenerator 850 includes components similar to that of the signal regenerator 450 illustrated in FIG. 5A. Thus, the detailed descriptions with regard to the similar components are not repeated. The signal regenerators 450 and 850 in FIGS. 5A and 9A differ in that the regenerator 850 includes a modulator 920 structured to output a symbol based on the demodulated bits output (in the case of hard pre-decoding interference cancellation) or bit LLRs (in the case of soft pre-decoding interference cancellation) from the demodulator 430. The signal regenerators 450 and 850 in FIGS. 5B and 9B differ in that the regenerator 850 includes one or more modulators 925 structured to output a symbol based on the mapped (corresponding to channelization codes) demodulated bits (in the case of hard pre-decoding interference cancellation) or bit LLRs (in the case of soft pre-decoding interference cancellation) output from the serial-to-parallel converter 535.

Figure 10A:
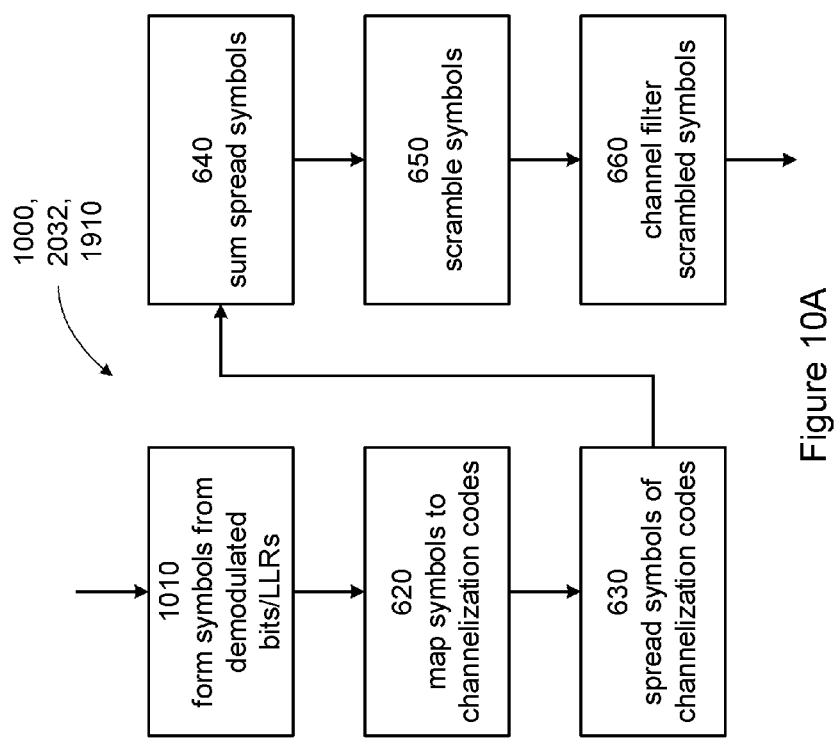
FIGS. 10A and 10B illustrate flow charts of example processes to regenerate an estimated signal (based on outputs of demodulator)
Figure 10B:
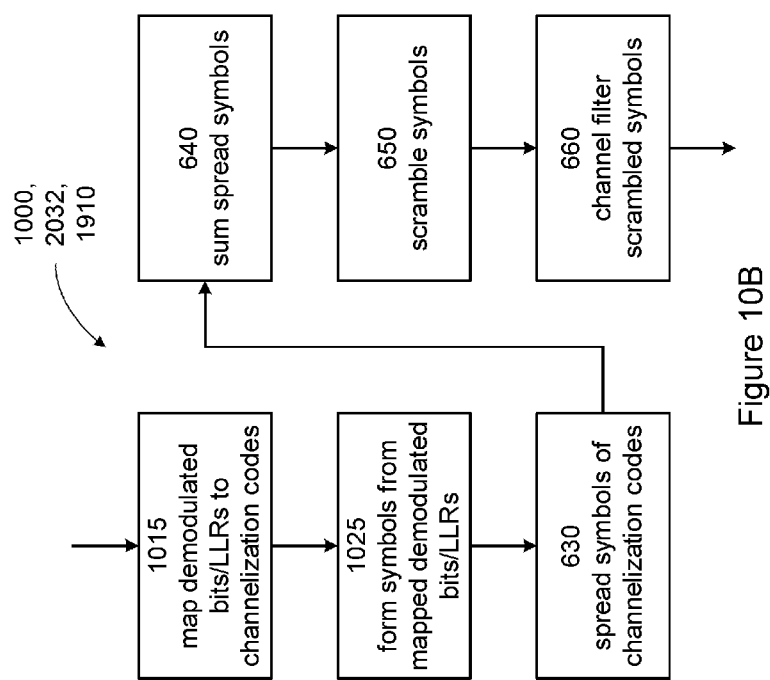

Flow charts of example processes for signal regeneration generation performed by the signal regenerators 850 of FIGS. 9A and 9B are respectively illustrated in FIGS. 10A and 10B. In FIG. 10A, the modulator 920 in step 1010 forms the symbol estimate based on the demodulated bits or bit LLRs output by the demodulator 430. The remaining steps are similar to the steps in FIG. 6A. In FIG. 10B, the serial-to-parallel converter 535 maps the demodulated bits or bit LLRs from the demodulator 430 according to the channelization codes in step 1015, and the modulators 925 form the estimates of the symbol for channelization codes in step 1025. The remaining steps are similar to the steps in FIG. 6B. Again, when there is only one channelization code, steps 1015, 620 and 640 need not be performed in both FIGS. 10A and 10B.

Figure 11:
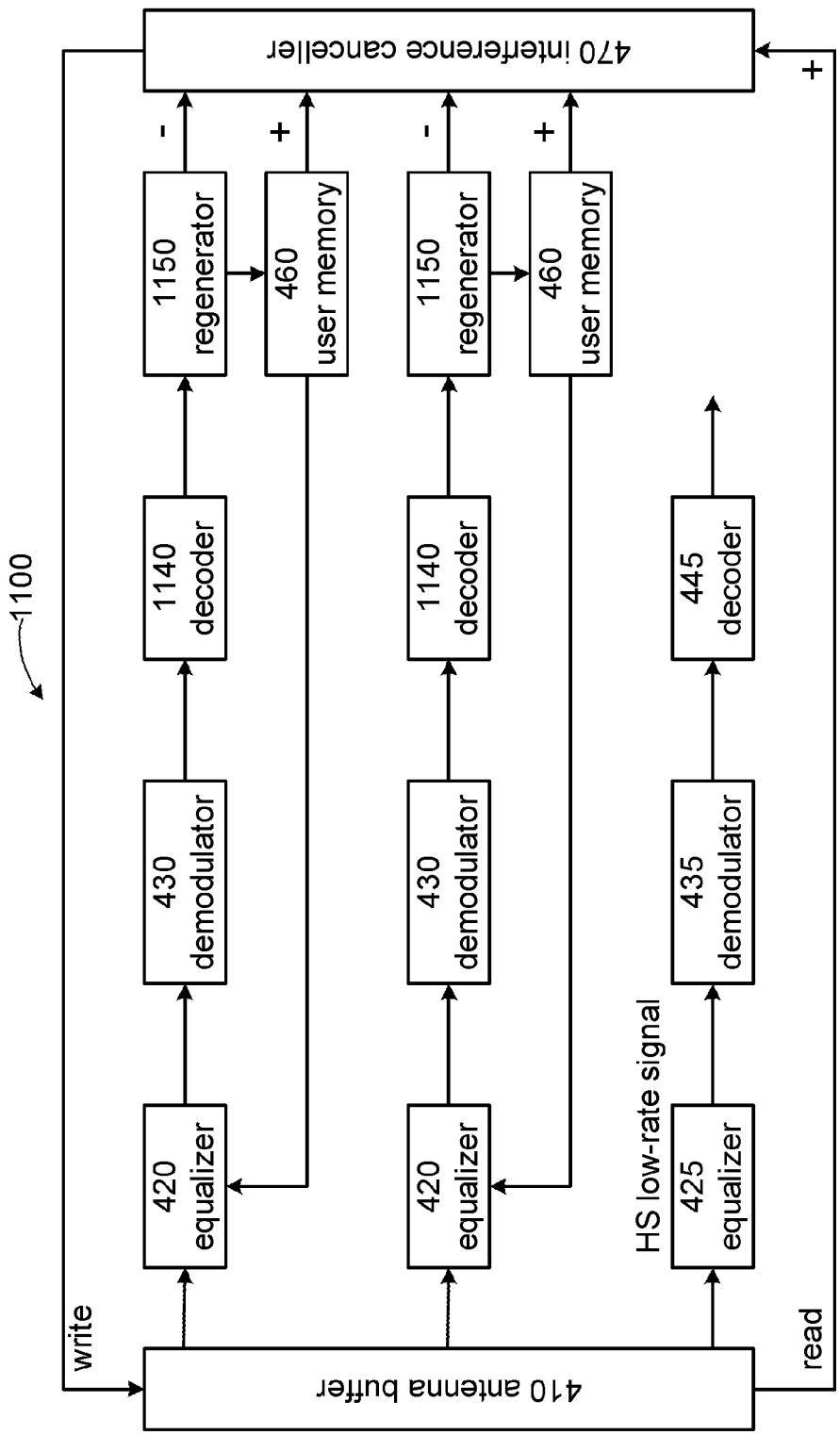
FIG. 11 illustrates a further example embodiment of an iterative receiver.
Figure 12A:
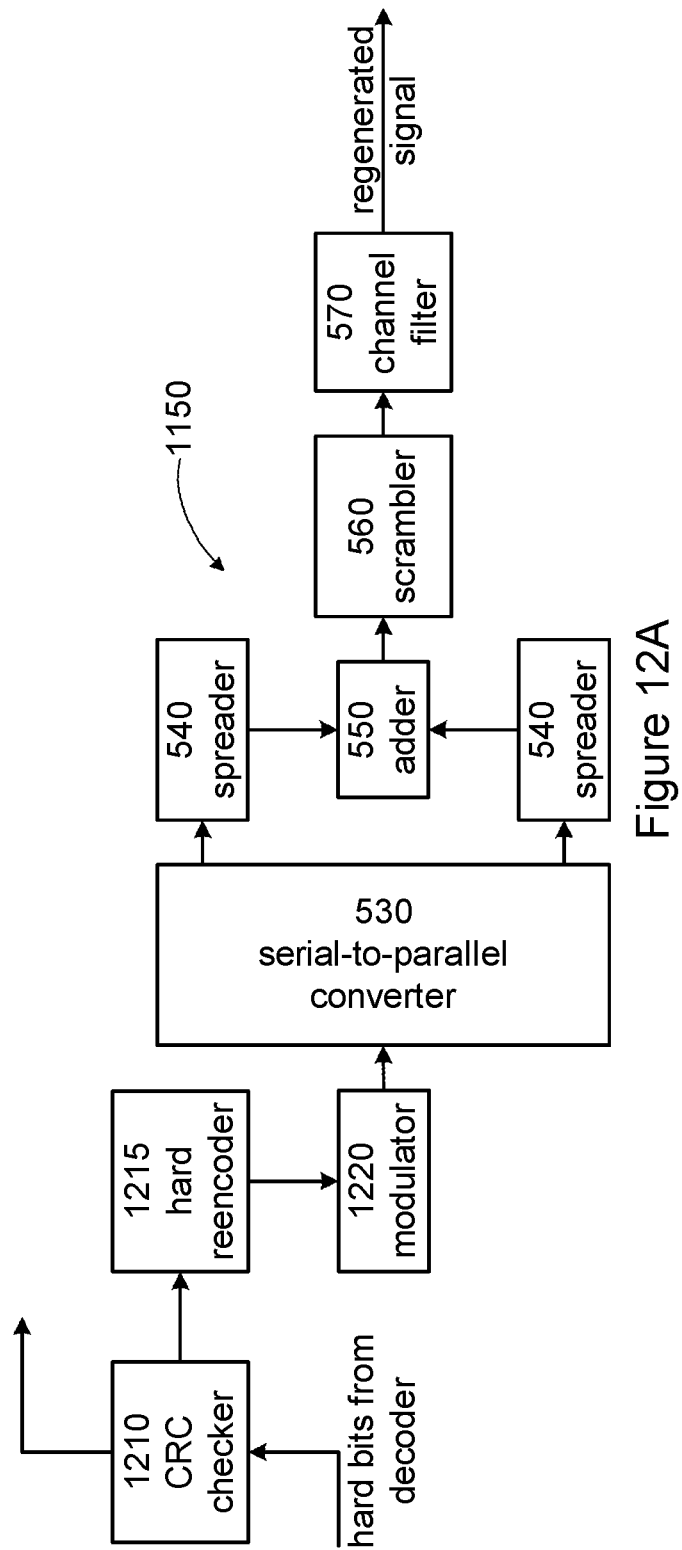
FIGS. 12A and 12B illustrate example embodiments of a signal regenerator (with symbol modulator)
Figure 12B:
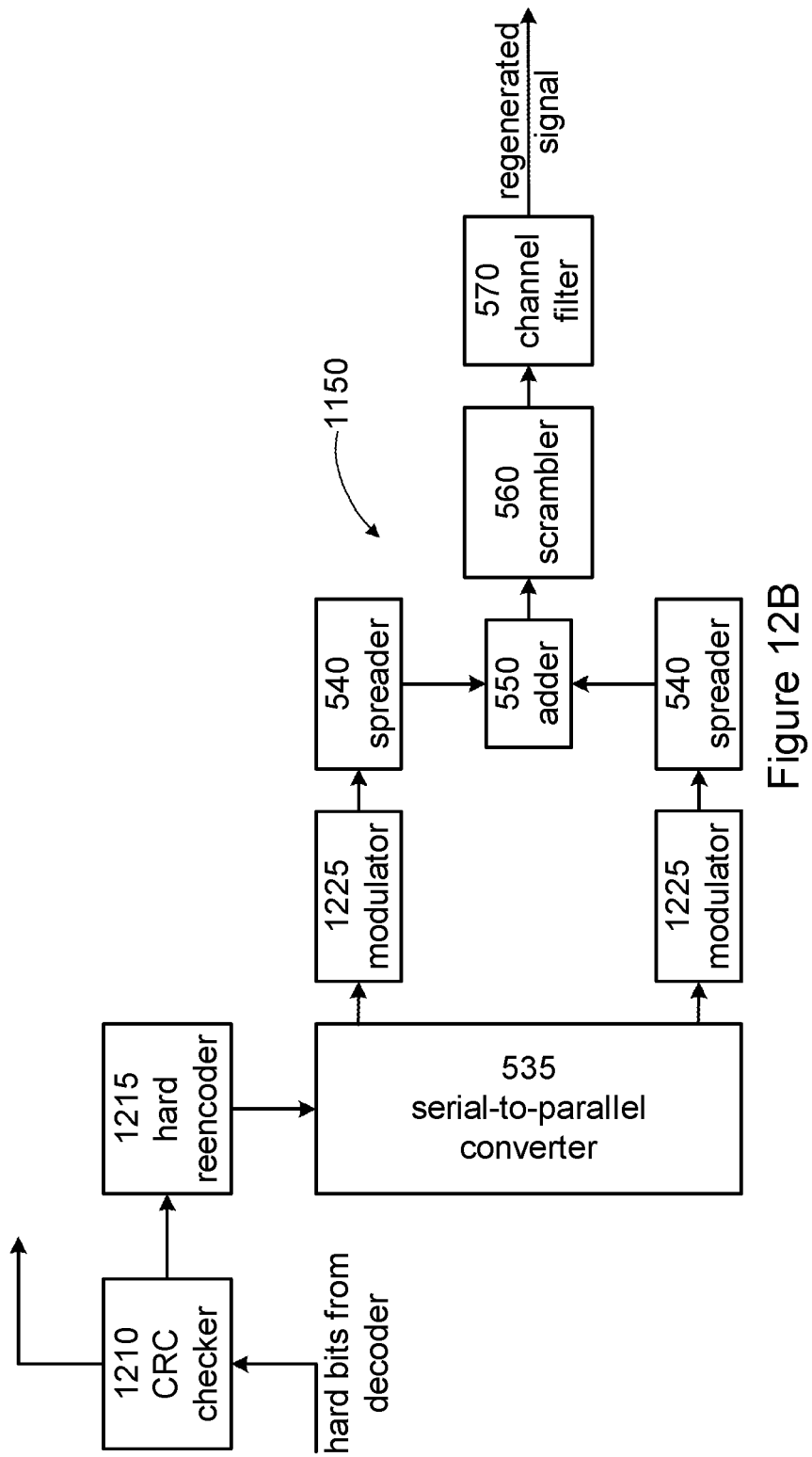

A high-level architecture of yet another example turbo-IC receiver capable of recovering the information bits from the first and second signals is shown in FIG. 11. In the receiver 1100, the decoder 1140 is assumed to output hard information bits instead of encoded bit likelihood indicators, and signal regenerator 1150 can regenerate the signal based on the hard information bits. Example high level architectures of the signal regenerator 1150 are shown in FIGS. 12A and 12B. Again, detailed descriptions of similar components are not repeated.

For iterative hard post-decoding multi-layer or multi-user interference cancellation, the regeneration of the signal can be based on hard information bits of the decoder output when the cyclic redundancy check (CRC) passes. As seen in FIGS. 12A and 12B, the signal regenerator 1150 includes a CRC checker 1210 structured to check the CRC of the output of the decoder 1140 and a hard reencoder 1215 structured to encode the output of the decoder 1140 to generate reencoded bits. When the CRC does not pass, the estimated signal is neither regenerated nor cancelled as seen by the arrow exiting from top of the CRC checker 1210. When the CRC does pass, the signal can be regenerated by first reencoding the detected hard information bits from the decoder 1140 and then forming the estimated symbols based on the reencoded data. This is illustrated by the arrow from the reencoder 1215 entering the modulator 1220.

Figure 13A:
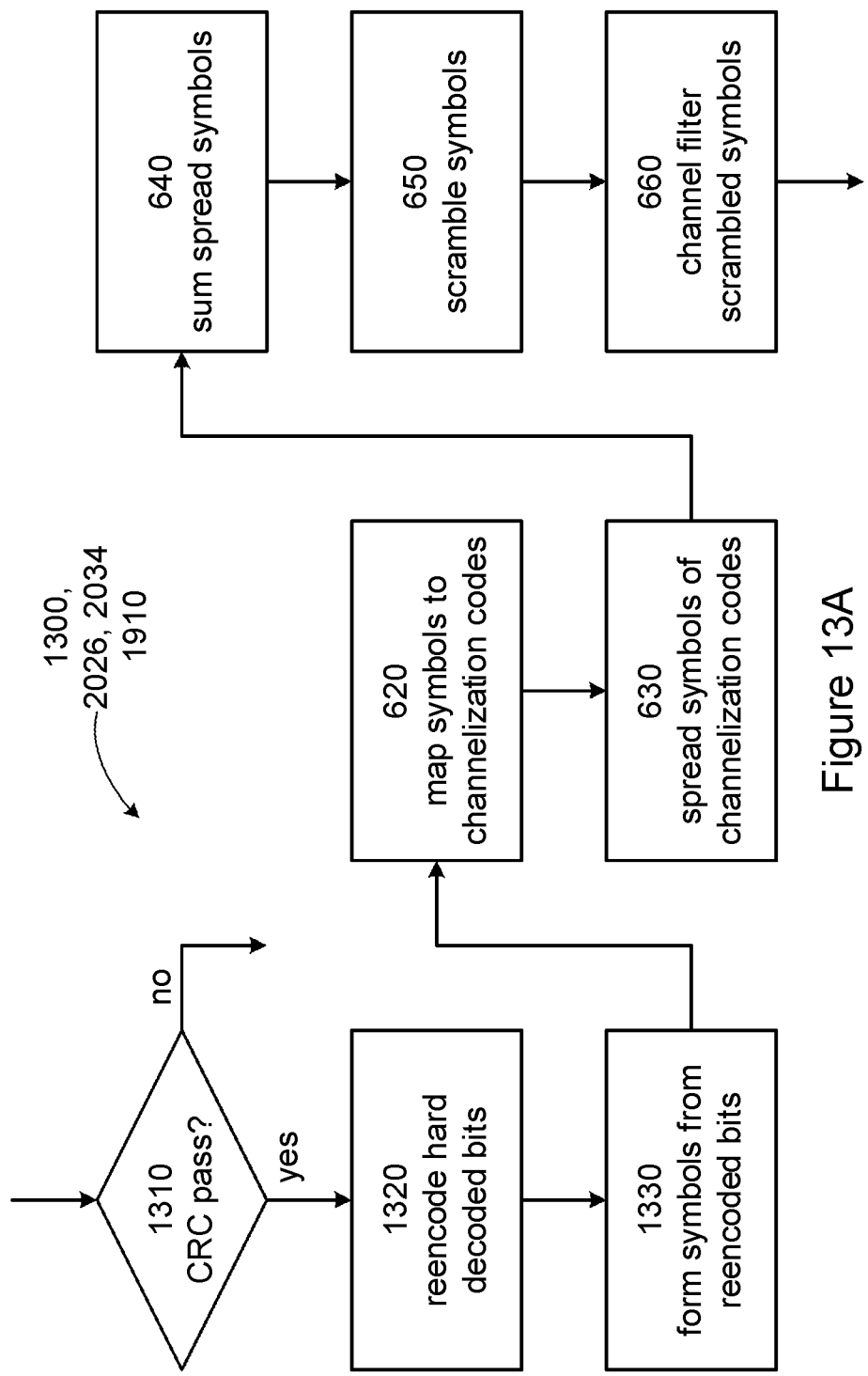
FIGS. 13A and 13B illustrate flow charts of example processes to regenerate an estimated signal (based on hard outputs of decoder)
Figure 13B:
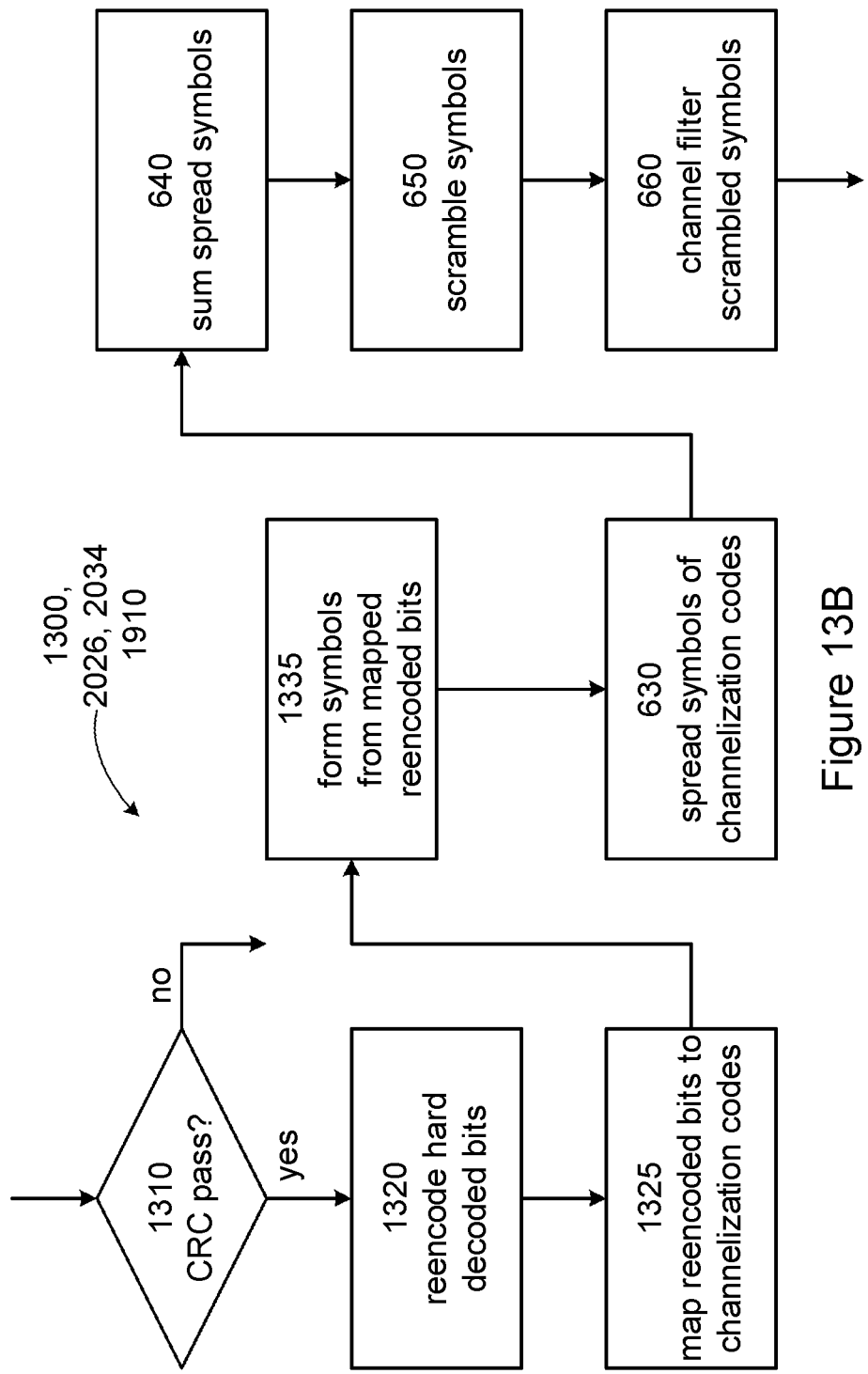

Flow charts of example processes for signal regeneration generation performed by the signal regenerator 1150 are illustrated in FIGS. 13A and 13B. As seen, in the CRC checker 1210 determines whether the CRC passes in step 1310. In FIG. 13A, if the CRC passes, then in step 1320, the reencoder 1215 reencodes the decoded hard information bits from the decoder 1140, and in step 1330, the modulator 1220 forms the symbol estimate based on the reencoded bits. If the CRC does not pass, regeneration is not performed. The remaining steps are similar to the steps of FIGS. 6A and 10A.

In FIG. 13B, if the CRC passes in step 1310, the reencoder 1215 reencodes the decoded hard information bits from the decoder 1140, and in step 1325, the serial-to-parallel converter 535 maps the reencoded bits according to the channelization codes. Then in step 1335, the modulators 1225 form the estimates of the symbol for channelization codes based on the mapped reencoded bits. If the CRC does not pass, regeneration is not performed. The remaining steps are similar to the steps of FIGS. 6B and 10B.

Figure 14:
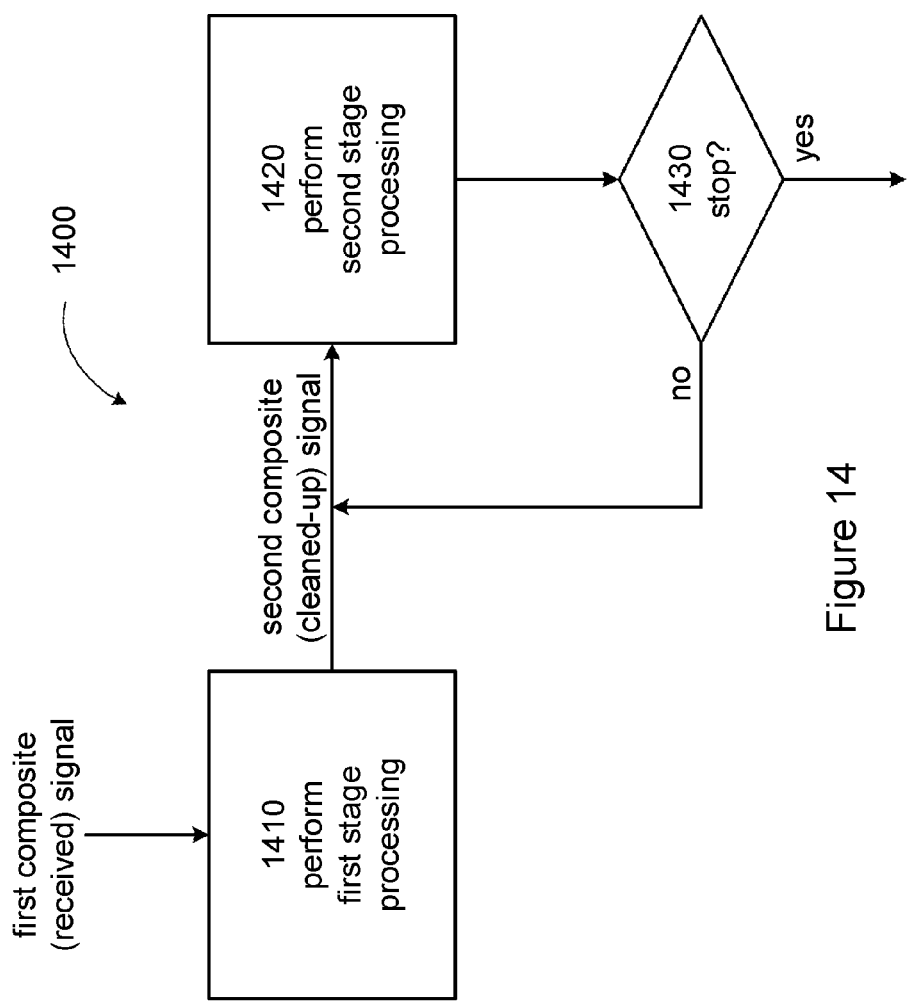
FIG. 14 illustrates a flow chart of an example method for updating impairment covariance and combining weights.

As mentioned previously, in an iterative multi-stage interference-cancellation, the interference characteristics can change as a portion of the interference is cancelled. In one aspect of the disclosed subject matter, the impairment covariance and/or combining weights are updated according to the new interference characteristics after interference cancellation. An example method for processing signals is illustrated in FIG. 14. The impairment covariance and/or combining weights are updated as the signals are processed. The method 1400 can be performed in the receive node 230 of a communication network 100 to process a symbol of interest carried in a received signal. For example, the symbol of interest can be a symbol carried in the first signal $x_1$.

Broadly, in the method 1400, the receive node 230 performs a first stage processing on the symbol of interest contained in a first composite signal in step 1410. Subsequently, the receive node 230 performs a second stage processing 1420 on the same symbol of interest contained in a second composite signal in step 1420. The first composite signal may be assumed to be the received signal r. In the first stage processing 1410, total impairment covariance affecting the symbol of interest is determined. After the first stage processing 1410, a cleaned-up signal is generated by canceling at least a portion of the interferences of the first composite signal. The cleaned-up signal can be viewed as an interference-reduced version of the first composite signal.

As a result of interference cancellation in the first stage processing 1410, the interference characteristics of the cleaned-up signal will likely be different from the originally received signal. Thus, in the second stage processing 1420, the impairment covariance and/or combining weights are adapted accordingly and the interference can be further canceled. This could result in a further cleaned-up signal. The further cleaned-up signal is also an interference-reduced version of the first composite signal.

In step 1430, the receive node 230 determines whether the processing of the symbol of interest can stop. This can be determined in a variety of ways such as reaching a predetermined level of interference cancellation, reaching a predetermined number of iterations of the second stage processing 1420, reaching CRC check, reaching a predetermined level QoS parameters such as of SINR, BER, FER, and so on. If further processing is needed ("no" branch from 1430), the second stage processing 1420 is performed again.

Note that each second stage processing 1420 can change the interference characteristics. Thus, through each iteration of the second stage processing 1420, the impairment covariance and/or the combining weights are readapted based on the changed interference characteristics, i.e., based on the interference characteristics of the second composite signal inputted to the second stage processing 1420. As indicated in the companion application, processing delays can be determined as the interference characteristics change, and the despreading and combining of the signal can be performed based on the processing delays.

A more detailed example implementation of the method 1400 to update impairment covariance and combining weights is described as follows. Prior to the first stage processing 1410 being performed, no interference cancellation has been done for the symbol of interest. Thus, impairment covariance can be estimated through using unoccupied channelization code despreading and averaging as explained in U.S. Publication 2008/0304554 ('554 Publication) which is hereby incorporated in its entirety by reference. For the first signal $x_1$ in the first stage processing 1410, let $C_1$ be the impairment covariance matrix obtained for the G-Rake+ equalizer 420 equalizing the first signal $x_1$ (e.g., the top equalizer 420 in FIG. 4). It can be shown that $$C_1 = E(1)C_{I,1}(1) + E(2)C_{I,1}(2) + R_{N,1}, \quad (4)$$

where $E(i)$ is the total symbol energy for signal i, $C_{I,1}(i)$ is the impairment covariance matrix contributed by signal i, and $R_{N,1}$ accounts for contribution by signals that are not included in turbo-IC cancellation, plus noise.

In one aspect, the impairment covariance matrix $C_1$ of equation (4) is a total impairment covariance (derived non-parametrically), or at least an estimate thereof, obtained before any interference cancellation has taken place for the symbol of interest. Equation (4) is mainly to illustrate the composition of $C_1$. But it should be noted that when unoccupied channelization code despreading and averaging is used as described in the '554 Publication, $C_1$ can be obtained directly without knowing its composition, i.e., non-parametric estimation.

Note that from the perspective of the first signal $x_1$, $C_{I,1}(1)$ is due to self interference, whereas $C_{I,1}(2)$ is due to other-signal interference (e.g., due to the second signal $x_2$). The expression for the element of $C_{I,j}(i)$ corresponding to fingers having delays $d_1$ and $d_2$ is given by $$(C_{I,j}(i))_{d_1,d_2} = \frac{1}{N} \sum_{l=0}^{L(i)-1} \sum_{q=0}^{L(i)-1} g_i(l) g_i^*(q) \chi(i, j, d_1 - \tau_i(l), d_2 - \tau_i(q)) \quad (5)$$

in which N is the spreading factor of signal j (which the equalizer under consideration is associated with), L(i) is the number of resolvable paths corresponding to signal i's propagation channel, and $g_i(l)$ and $\tau_i(l)$ are the complex channel coefficient and delay corresponding to the lth path, respectively. The function $\chi(i, j, t_1, t_2)$ is represented as follows:

$$\chi(i, j, t_1, t_2) = \sum_{m=-\infty}^{\infty} (1 - \delta(i-j)\delta(m)) R_p(t_1 - mT_c) R_p^*(t_2 - mT_c) \quad (6)$$

where $R_p(\tau)$ is the pulse shape autocorrelation function. In equation (6), the term $1-\delta(i-j)\delta(m)$ is used to exclude the contribution from m=0 only in the case of self interference (i=j). This is due to the use of orthogonal spreading codes.

As mentioned earlier, the soft modulators 520, 525 (See FIGS. 5A, 5B) can use the likelihood indicators (e.g., the bit LLRs) output from the decoder 440 to compute the conditional mean (soft symbol) for a symbol of interest. A detailed description can be found in US Patent Publication 2011/0222618 ('618 Publication) which is herein incorporated it its entirety by reference. The level of interference cancellation depends on the variance of a regenerated soft symbol. The variance of the symbol for signal j on the kth channelization code during the ith symbol interval can be obtained by $$\sigma_{\tilde{s},j}^2(k,i) = E[|s_j(k,i)|^2 | I_j(k,i)] - |[s_j(k,i)|I_j(k,i)]|^2, \quad (7)$$

where $I_j(k,i)$ are the soft outputs from the decoder 440 which indicate the LLRs of a number of encoded bits used to determine the symbol $s_j(k,i)$. The expression of equation (7) can also be referred to as the variance of the symbol $s_j(k,i)$. Note that if the decoder 440 outputs likelihood indicators $I_j(k,i)$ that indicate complete certainty of bits having values 1 or 0, then the variance $\sigma_{\tilde{s},j}^2(k,i)=0$. In other words, signal j does not contribute to the impairment covariance matrix when complete certainty is indicated. On the other hand, if $I_j(k,i)$ bits indicate equal likelihood of value 1 or 0, then $\sigma_{\tilde{s},j}^2(k,i)=1$.

The variance can be further averaged over all the symbols (over k and i), $$\sigma_{\tilde{s},j}^2 = \frac{1}{KI} \sum_{k=0}^{K-1} \sum_{i=0}^{I-1} \sigma_{\tilde{s},j}^2(k, i). \quad (8)$$

In the second IC iteration, the impairment covariance matrix can be updated based on the computed soft symbol variances. Let $\tilde{C}_1$ represent the impairment covariance matrix after interference cancellation. In can be shown that $\tilde{C}_1$ becomes $$\tilde{C}_1 = E(1)\sigma_{\tilde{s},1}^2 C_{I,1}(1) + E(2)\sigma_{\tilde{s},2}^2 C_{I,1}(2) + R_{N,1}. \quad (9)$$

$\tilde{C}_1$ can be obtained by parametrically updating the original (total) impairment covariance matrix $C_1$ as seen in the following equations.

$$\tilde{C}_1 = C_1 - \Delta C_1 \quad (10)$$

$$\Delta C_1 = E(1)\eta(1) C_{I,1}(1) + E(2)\eta(2) C_{I,1}(2) \quad (11)$$

$$\eta(i) = 1 - \sigma_{\tilde{s},i}^2 \quad (12)$$

As indicated above, the original impairment covariance matrix $C_1$ can be obtained using the unoccupied channelization code despreading and averaging.

In equations (10), (11) and (12), $\eta(i)$ can be thought of as the cancellation efficiency from soft subtraction, which is determined by the variance, or average power, of the interfering symbol estimates. Also $E(i)\eta(i)$ can be thought of as the update factor. When the impairment covariance matrix estimate is updated as indicated above, the updated impairment covariance matrix $\tilde{C}_1$ can be used to form new G-Rake+ equalizer combining weights $w_1 = \tilde{C}_1^{-1} h_1$, where $h_1$ is the net response for the signal $x_1$.

The variance $\sigma_{\tilde{s},j}^2$ can be approximated by the residual interference power after cancellation. In this instance, the conditional mean $\bar{s}_j(k,i) = E[s_j(k,i)|I_j(k,i)]$, which is output by the soft modulators 520, 525, can be used as estimated interfering symbols for cancellation. Thus, on average, the amount of interference power that is cancelled is $$P_{IC}(j) = \frac{1}{KI} \sum_{k=0}^{K-1} \sum_{i=0}^{I-1} |\bar{s}_j(k, i)|^2.$$

The residual power from signal j is thus $E(j)(1-P_{IC}(j))$. In this case, the impairment covariance matrix after IC becomes $$\tilde{C}_1 = E(1)(1-P_{IC}(1))C_{I,1}(1) + E(2)C_{I,1}(2) + R_{N,1} \quad (13)$$

Based on equations (9), (12) and (13), it is seen that the cancellation efficiency becomes $\eta(i) = 1 - \sigma_{\tilde{s},i}^2 = P_{IC}(i)$.

In the signal regeneration and cancellation process, a number of channels can be included. In addition to data channels, control channels and pilots can be regenerated and cancelled.

These channels can be regenerated and cancelled separately, or together with the data channels in one step. The general covariance estimate update principle described above is applicable also for control channels and pilots.

Note that the detailed example above describes post-decoding turbo-IC with soft bit decisions for both cancellation and covariance matrix update. Post-decoding IC denotes a way in which the soft output of the decoder 440 is used to regenerate an estimate of the received signal as illustrated in FIGS. 4, 5A, 5B, 6A and 6B, which is then subtracted in the interference cancellation process. However, there are several different alternatives for cancellation and covariance updates, and they can be applied differently for different types of symbols, such as data symbols, control symbols and pilot symbols.

One alternative is to use the output of the demodulator 430 to regenerate the estimated signal as illustrated in FIGS. 8, 9A, 9B, 10A and 10B. This is denoted as pre-decoding IC in which the properties of the FEC code are not necessarily used to improve the regeneration. However, the regeneration can be made sooner, without incurring a decoding processing delay. In this case, the likelihood indicators $I_j(k,i)$ in equation (7) will correspond to the outputs from the demodulator 430 instead of the decoder 440.

Another design choice is whether to use hard or soft bit decisions (or more generally hard or soft symbol estimations) in the regeneration process as illustrated in 11, 12A, 12B, 13A and 13B. Hard bit decisions are typically easier to implement, and if the decisions are correct, the performance is good. However, if there are uncertainties in the bit values, soft bits and soft symbols are preferably used in signal regeneration as in FIGS. 4, 5A, 5B, 6A and 6B.

For the impairment covariance matrix update, there is a possibility to use either hard or soft bit decisions. Typically, if soft (or hard) bits are used in the signal regeneration, also soft (or hard) bits are preferably used for the impairment covariance update. But there can be exceptions. For example, even if hard decisions are used for signal regeneration due to hardware and software simplifications, one may want to use soft bits in the impairment covariance matrix update since hard decisions can contain greater degree of errors, and hence, the cancellation may not be satisfactory.

Conversely, there can be instances where soft bits are used for signal regeneration, but hard decisions are used in the impairment covariance update. For example, if the signal regeneration and the impairment covariance update are performed in parallel or separated in hardware or software in such a way that the soft bits are not available when the impairment covariance matrix is to be updated, hard bits can be used.

When hard bit decisions are used for the impairment covariance matrix update, there are several options for how to reflect the confidence in these bits or symbols. In one aspect, completely correct detection decisions are assumed by assigning variance $\sigma_{\tilde{s}_j}^2(k,i)=0$ for those symbols. Another option for symbols with hard decisions is to still use soft information as described above even though the soft values are converted to hard decisions in the process that regenerates and cancels the signal. This can reflect some uncertainty in the correctness of the hard decisions.

In another aspect, post-decoding bits are used for the signal regeneration and the pre-decoding bits are used for the impairment covariance update, and vice versa. These design choices can enable efficient hardware and software implementation. There is also the possibility to use an older or filtered estimate of the cancellation efficiency $\eta(i)$ or the update factor $E(i)\eta(i)$ when performing the impairment covariance matrix update (see equations (10), (11) and (12)).

For coded channels such as data channels, post-decoding IC is typically used. However, pre-decoding IC is an alternative for the coded channels. For data symbols, soft bits are typically used for both signal regeneration and impairment covariance update.

For control channels that need to be correctly detected before the interference cancellation can start, it is typical to assume that the control bits have been correctly detected, so hard decisions are used. However, also here, soft bit decisions can be used for signal regeneration and/or impairment covariance update.

For pilot symbols hard bit decisions are preferably used, since no decisions are needed because the bit values are known already beforehand. In the signal regeneration, hard decisions can be used. But for the impairment covariance update, using soft bits can be advantageous to reflect other uncertainties than incorrect bit decisions in the interference cancellation, for example errors in the channel estimate used for signal regeneration.

The variances of the symbols from different control channels can be averaged separately, and also separately from the data channels, using, e.g., equation (8). For example, let $\sigma_{\tilde{s},j,d}^2$, $\sigma_{\tilde{s},j,c}^2$, and $\sigma_{\tilde{s},j,p}^2$ be the averaged variances for the data, control, and pilot (or a different control) channels, respectively, and $\alpha_d$, $\alpha_c$, and $\alpha_p$ be their respective power allocation factors. The parametric update can be obtained by equations (10) and (11). However, the cancellation efficiency becomes $$\eta(i)=\alpha_d(1-\sigma_{\tilde{s},j,d}^2)+\alpha_c(1-\sigma_{\tilde{s},j,c}^2)+\alpha_p(1-\sigma_{\tilde{s},j,p}^2) \quad (14)$$

Thus far, channels that are not included in the IC processing (e.g., some control channels and possible other low-rate channels from the same user or antenna) have been ignored. To account for this, let $\beta$ be the fraction of power allocated to the channels that are not cancelled using turbo-IC, and thus $1-\beta$ to the channels that are included in turbo-IC. In this case, the cancellation efficiency calculated according to equations (12) and (13) can be further scaled by the factor $1-\beta$. In this case, the impairment covariance matrix after interference cancellation becomes $$\tilde{C}_1=E(1)(\beta(1)+(1-\beta(1))\sigma_{\tilde{s},1}^2)C_{I,1}(1)+E(2)(\beta(2)+(1-\beta(2))\sigma_{\tilde{s},2}^2)C_{I,1}(1)+R_{N,1} \quad (15)$$

Note that when $\beta=0$, equations (9) and (15) become identical. Regardless, the residual interference power level can be calculated using the knowledge of total signal power, power allocation to the channels that are included in turbo-IC, and the decoder feedback.

The impairment covariance matrix contributed by signal i, $C_{i,1}(i)$, can be calculated using equations (5) and (6). Note that $\chi(i,j,t_1,t_2)$ can be pre-computed and stored in a table for a number of $(t_1, t_2)$ combinations. As a result, the updated impairment covariance matrix $\tilde{C}_1$ can be obtained by parametrically modifying the original impairment covariance matrix $C_1$. The power levels $E(i)$ or power allocation factors $\beta$, $\alpha_d$, $\alpha_c$, and $\alpha_p$ can be estimated using a code power estimation method as described in the '719 publication.

An alternative approach to calculating the impairment covariance estimate update $\tilde{C}_1$ is to use the regenerated transmit signal. In an interference cancelling receiver, such as a turbo-IC receiver, first a regenerated transmit signal including all data, control and pilot channels that will be cancelled is calculated. This regenerated transmit signal is filtered with an estimate of the channel to obtain a regenerated receive signal, which is then cancelled, for example by subtracting it from the antenna buffer that stores the received signal. The update factor $E(i)\eta(i)$ in equation (11) can then be directly estimated for each user i by setting it to the average variance or power of the regenerated transmit signal for that user.

Figure 15:
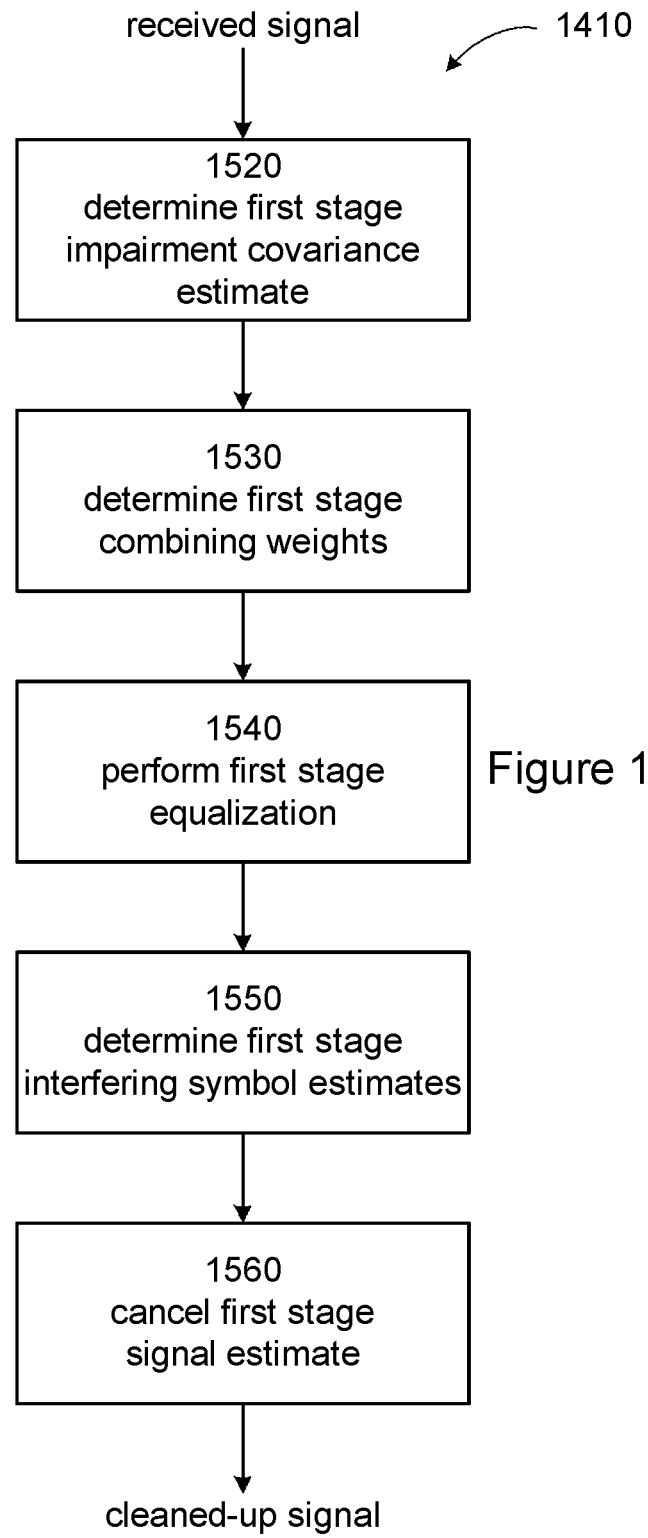
FIG. 15 illustrates a flow chart of an example process to implement a first stage processing of the method for updating impairment covariance and combining weights.

FIG. 15 illustrates a flow chart of an example process performed by the receiver 400, 800, 1100 to implement the first stage processing 1410 for the symbol of interest contained in the first composite signal. As seen, the equalizer 420 determines in step 1520 the first stage impairment covariance estimate.

Figure 16:
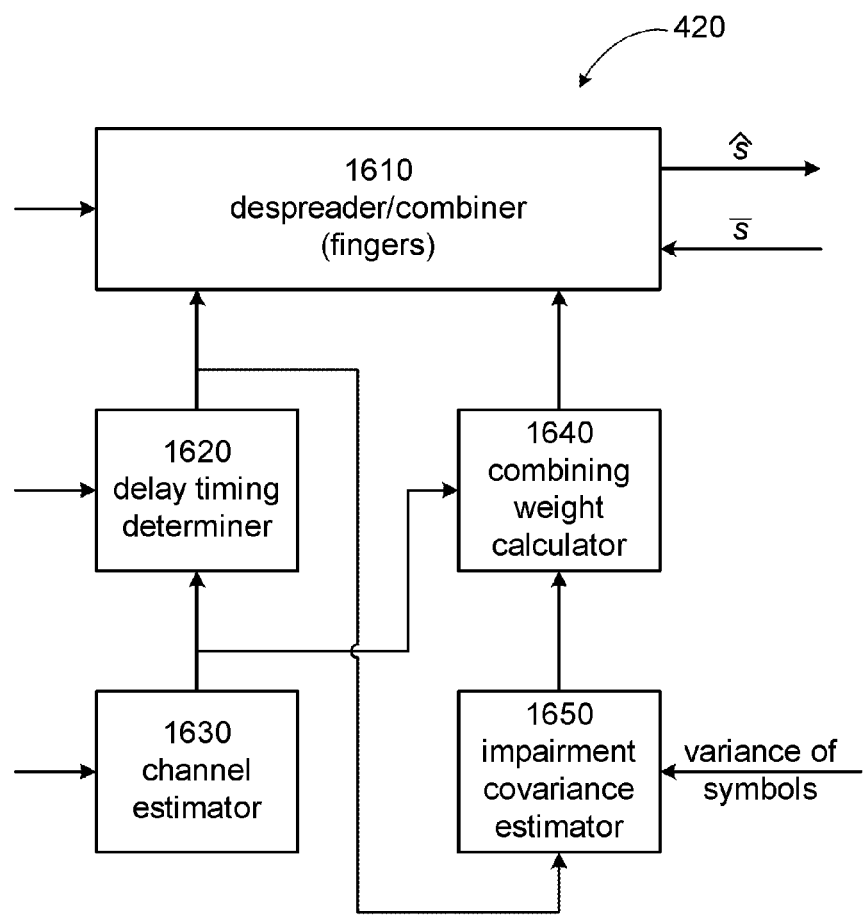
FIG. 16 illustrates an example embodiment of a G-Rake equalizer.

FIG. 16 illustrates an example architecture of a G-Rake+ equalizer 420. As seen, the equalizer 420 includes a despreader/combiner 1610 that includes a plurality of fingers. The despreader/combiner 1610 is structured to output despread and combined value for the symbol of interest. A delay timing determiner 1620 is structured to determine the delays (finger placements) for each despread value, and a combining weight calculator 1640 is structured to calculate the weight of each despread value. A channel estimator 1630 is structured to estimate the channel and an impairment covariance estimator 1650 is structured to estimate the impairment covariance of the first composite signal.

Referring back to FIG. 15, the impairment covariance estimator 1650 determines the first stage impairment covariance matrix in step 1520. In one aspect, the impairment covariance estimator 1650 estimates the first stage impairment covariance matrix based on unoccupied channelization code despreading and averaging. Based on the first stage impairment covariance matrix, the combining weight calculator 1640 determines the first stage combining weights in step 1530.

Figure 17A:
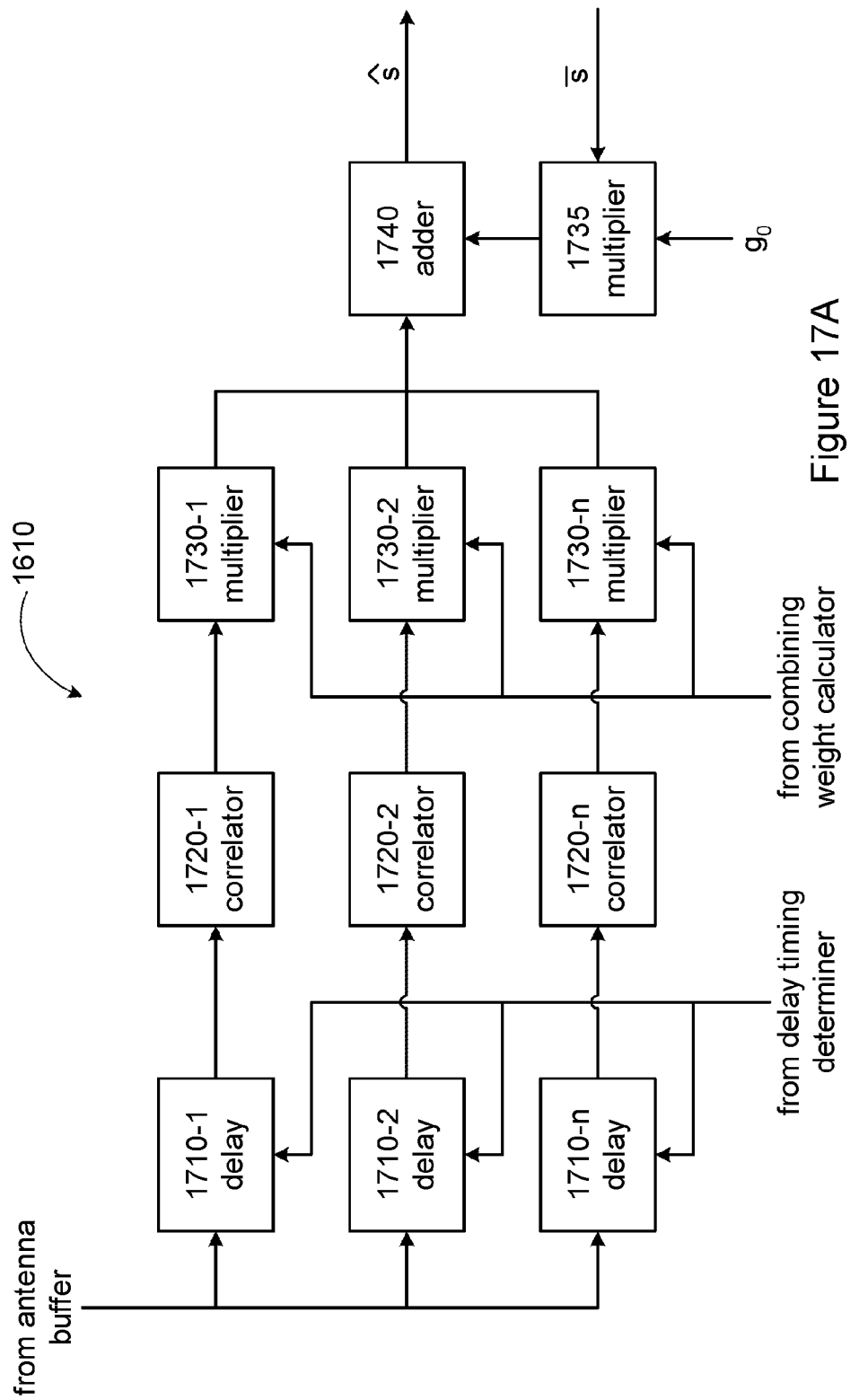
FIGS. 17A and 17B illustrate example embodiments of a despreader/combiner of the G-Rake equalizer.
Figure 17B:
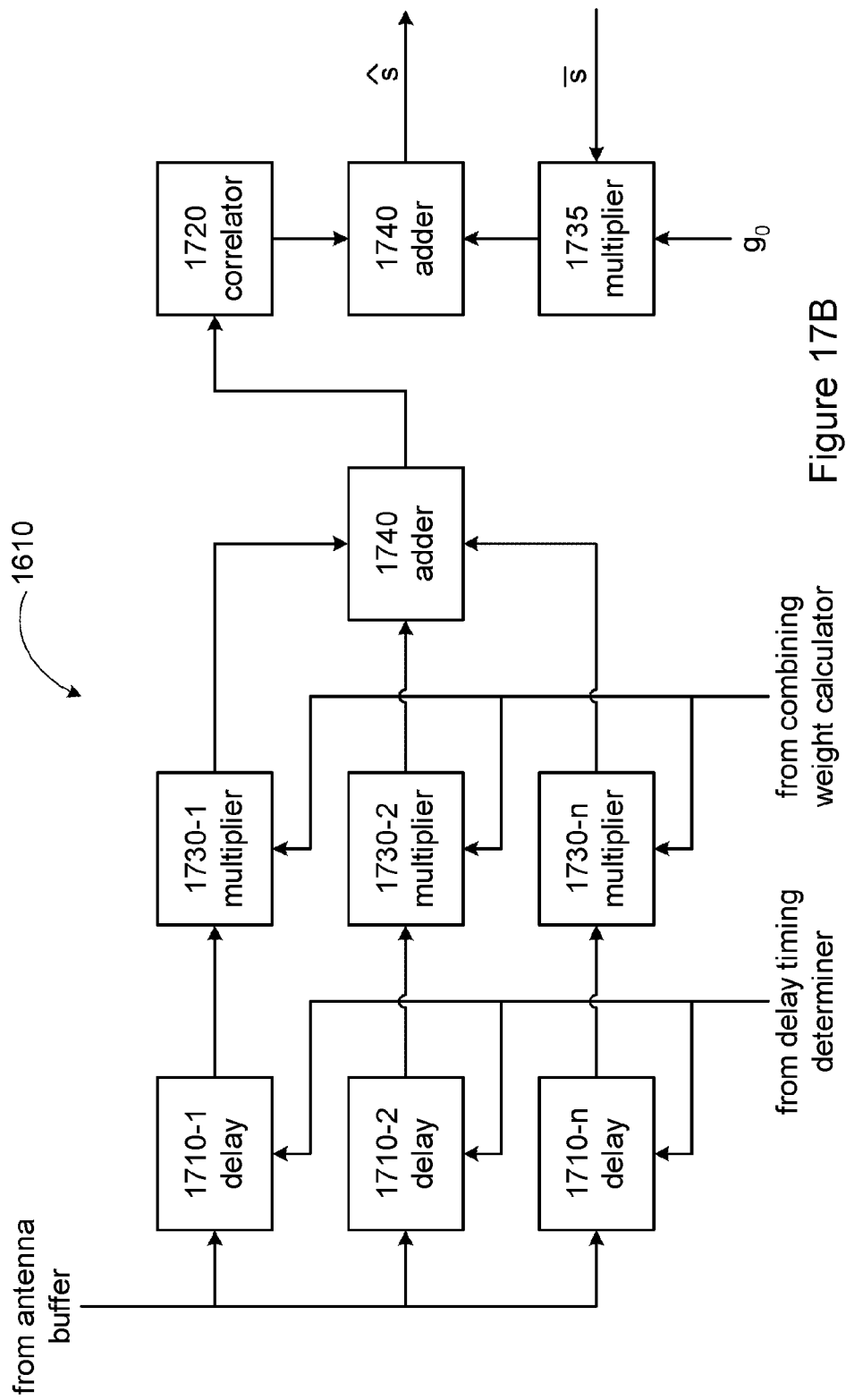
Figure 18:
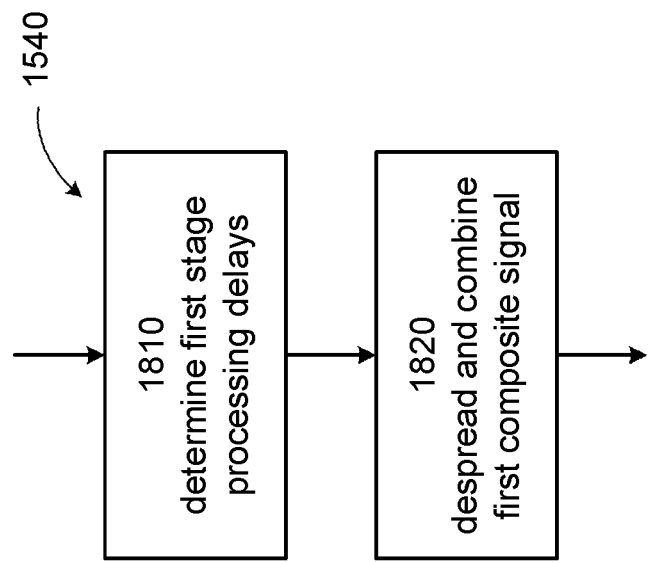
FIG. 18 illustrates a flow chart of an example process to perform a first stage equalization.

In step 1540, the equalizer 420 performs a first stage equalization. FIG. 18 illustrates a flow chart of an example process to implement step 1540. In step 1810, the delay timing determiner 1620 determines first stage processing delays. In step 1820, the despreader/combiner 1610 despreads and combines the first composite signal based on the first stage combining weights. As a result, a first stage equalized signal is output. The first stage equalized signal can be viewed as a stream of first stage equalized symbols. FIGS. 17A and 17B are example embodiments of the despreader/combiner 1610. As seen, both embodiments of the despreader/combiner 1610 can comprise a plurality of delays (fingers) 1710, one or more correlators 1720, a plurality of multipliers 1730, and one or more adders 1740. The embodiments can also include another multiplier 1735 for performing desired signal add-back processing described earlier.

The despreader/combiner 1610 embodiment illustrated in FIG. 17A despreads the first composite signal and combines the despread values based on the first combining weights provided by the combining weight calculator 1640 to output the first stage equalized signal. The despreader/combiner 1610 embodiments illustrated in FIG. 17B combines the first composite signal based on the first stage processing delays and the first combining weights, despreads the combined values, and the despread values are output as the first stage equalized signal. In these embodiments, the first combining weights can be combining weights of energy-collecting fingers only or combining weights for both energy-collecting and interference-suppression fingers.

Referring back to FIG. 15, the receiver 400, 800, 1100 estimates one or more first stage interferences to the symbol of interest based on the first stage equalized signal in step 1550. The interferences to the symbol of interest can be due to interferences in signals corresponding to other symbols being processed. This can be from own signal or from other signals. Thus, to estimate the first stage interferences, the first stage interfering symbol estimates are determined.

Figures 20A, 20B, 20C:
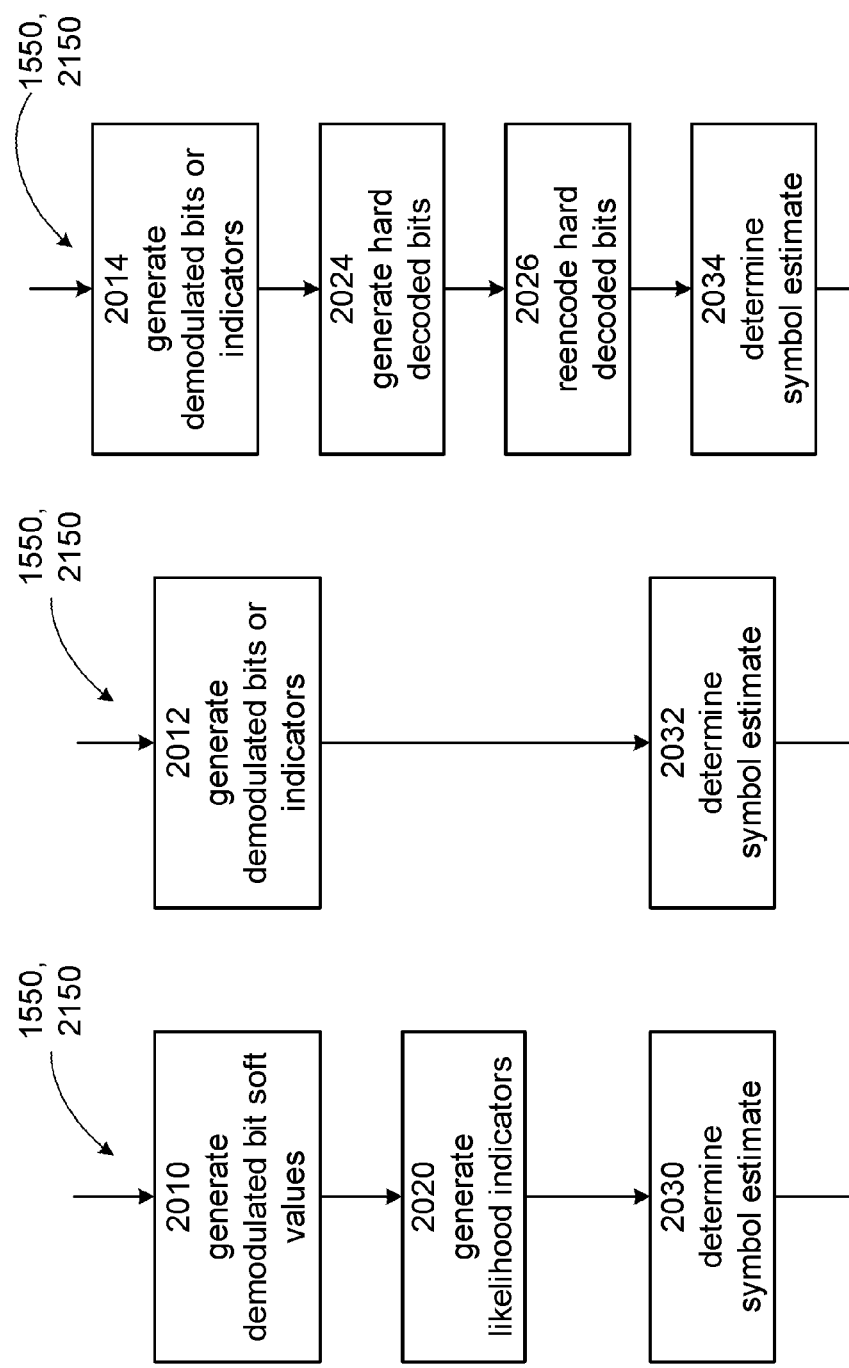
FIGS. 20A, 20B and 20C illustrate flow charts of example processes to estimate interferences.

In one aspect, the demodulator 430, the decoder 440 and the signal regenerator 450 can perform the step of estimating symbols including the symbol of interest as well as interfering symbols as illustrated in FIG. 20A. In this aspect, the first stage interferences are estimated based on soft outputs of the decoder 440. In step 2010, the demodulator 430 demodulates the first stage equalized signal and generates first stage demodulated bit soft values corresponding to the symbol of interest. In step 2020, the decoder 440 decodes the first stage demodulated bit soft values to generate first stage likelihood indicators such as LLR, ratios, and so on. Then in step 2030, the signal regenerator 450 determines the first stage estimates of the symbols in the signal of interest based on the first stage likelihood indicators generated by the decoder 440. Note that the demodulation/estimation steps are repeated for all symbols carried by signal $x_i$. In doing so, an estimate of the symbol of interest is generated. But estimates of the interfering symbols are also generated. That is, the first stage interfering symbol estimates are determined. The first stage interfering symbol estimates generated by the signal regenerator 450 correspond to the symbol estimates output by the soft symbol modulators 520, 525 in FIGS. 5A and 5B.

In another aspect, the demodulator 430 and the signal regenerator 850 can perform the step 1540 as illustrated in FIG. 20B. In this aspect, the pre-decoding signal regeneration is performed based on the hard or soft outputs of the demodulator 430. In step 2010, the demodulator 430 demodulates the first stage equalized signal and generates first stage demodulated bits (in case of hard pre-decoding IC) or first stage likelihood indicators (in case of soft pre-decoding IC). In step 2032, the signal regenerator 850 determines the first stage estimate of the symbol based on the first stage demodulated bits or likelihood indicators. Again, the demodulation/estimation steps are repeated for all symbols carried by signal $x_i$ to determine the first stage interfering symbol estimates. The first stage interfering symbol estimates generated by the signal regenerator 850 correspond to the symbol estimates output by the modulators 920, 925 in FIGS. 9A and 9B.

In yet another aspect, the demodulator 430, the decoder 1140 and the signal regenerator 1150 can perform the step 1540 as illustrated in FIG. 20C. In this aspect, the signal regeneration is performed based on hard outputs of the decoder 1140. In step 2014, the demodulator 430 demodulates the first stage equalized signal and generates first stage demodulated bits corresponding to the symbol. In step 2024, the decoder 1140 decodes the first stage demodulated bits to generate hard decoded information bits. In step 2026, assuming that the CRC check passes, the signal regenerator 1150 reencodes the hard decoded information bits, and in step 2034, the signal regenerator 1150 determines the first stage estimate of the symbol based on the hard outputs. Here, the reencode/demodulation/estimation steps are repeated for all symbols carried by signal $x_i$ to determine the first stage interfering symbol estimates. The first stage interfering symbol estimates generated by the signal regenerator 1150 correspond to the symbol estimates output by the modulators 1220, 1225 in FIGS. 12A and 12B.

Figure 19:
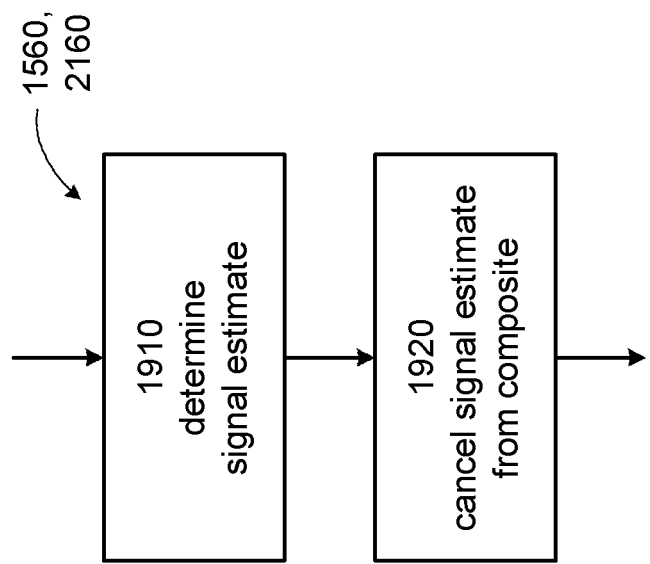
FIG. 19 illustrates a flow chart of an example process to cancel interferences.

Again referring back to FIG. 15, based on the first stage interfering symbol estimates determined in step 1550, the interference canceller 470 cancels the first stage signal estimate from the first composite signal to generate the interference-reduced version of the first composite signal in step 1560. An example process to implement step 1560 is illustrated in FIG. 19. In step 1910, an estimate of the signal is determined based on the first stage interfering symbol estimates. As indicated above, the demodulation/estimation steps are repeated for all symbols carried by signal $x_i$ to generate the first stage interfering symbol estimates, which can correspond to the outputs of the soft symbol modulators 520 and 525 in FIGS. 5A and 5B, to the outputs of the modulators 920 and 925 in FIGS. 9A and 9B, or to the outputs of the modulators 1220 and 1225 in FIGS. 12A and 12B. These interfering symbol estimates are spread, scrambled, and channel filtered to output the regenerated signal. The regenerated signal correspond to the outputs of the channel filter 570 in FIGS. 5A, 5B, 9A, 9B, 12A and 12B. The regenerated signal output by the signal regenerator 450, 850, 1150 can be viewed as an estimate of the signal of interest received at the receive node 210. Flow charts of FIGS. 6A, 6B, 10A, 10B, 13A and 13B are example implementations of the step 1910 of determining the signal estimate. Then in step 1920, the estimate of the signal of interest is canceled from the composite signal by the interference canceller 470.

After the first stage processing 1410, the second stage processing 1420 is performed to process the symbol of interest contained in the second composite signal. The second composite signal can be the interference-reduced version of the first composite signal. But recall that the second stage processing 1420 can be performed more than once. Thus the second composite signal can be an interference-reduced version of the second composite signal in a previous run of the second stage processing 1420.

Figure 21:
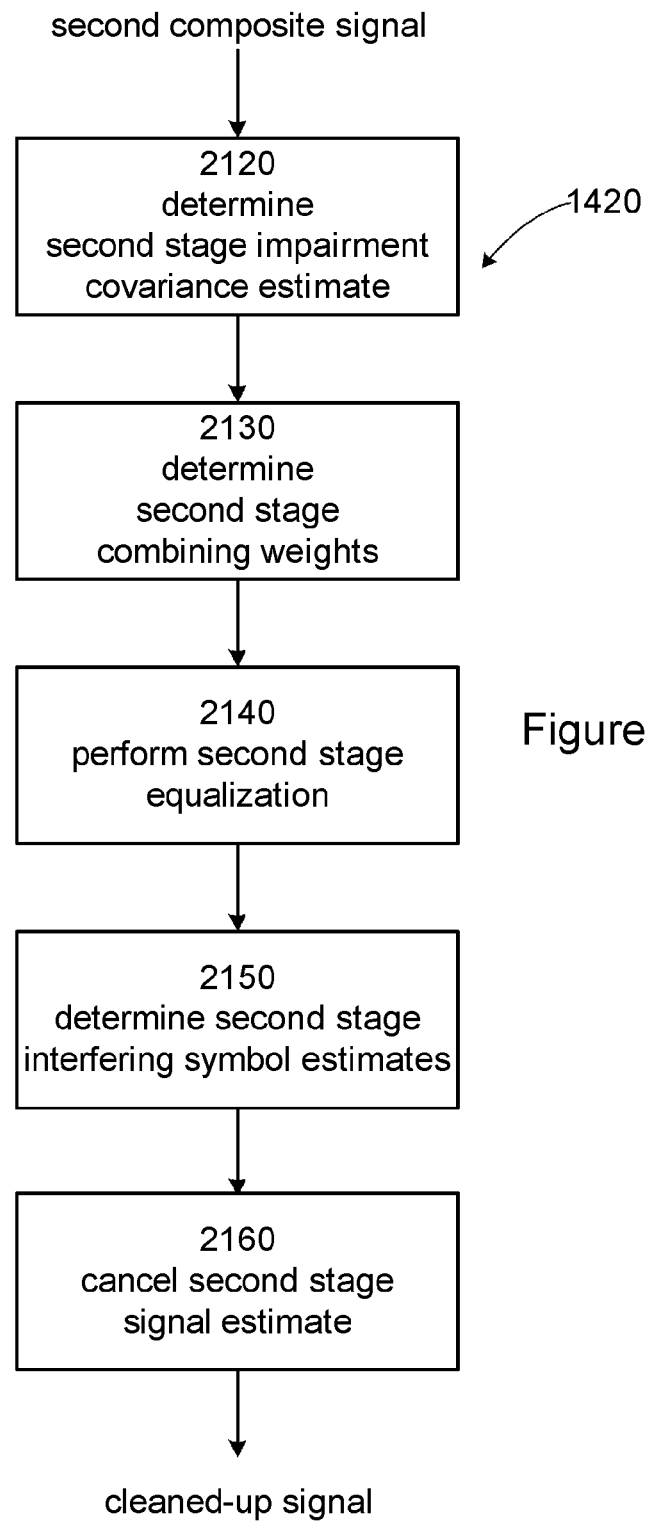
FIG. 21 illustrates a flow chart of an example process to implement a second stage processing of the method for updating impairment covariance and combining weights.

FIG. 21 illustrates a flow chart of an example process performed by the receiver 400, 800, 1100 to implement the second stage processing 1420 for the symbol of interest contained in the second composite signal. Recall from above that the level of interference cancellation can depend of the variance of a regenerated symbol. Also recall that the variance can be approximated by the residual interference power after cancellation. Further recall that the conditional mean can be used as an estimated interfering symbol for cancellation. As seen in equation (13), the impairment covariance matrix after interference cancellation depends on the residual power of the signals.

In step 2120, the equalizer 420, and the impairment covariance estimator 1650 in particular, determines the second stage impairment covariance estimate based on the first stage impairment covariance estimate and one or more previous stage interfering symbol estimates. As seen in equations (10), (11) and (12), the first stage impairment covariance estimate can be parametrically updated.

Figure 22:
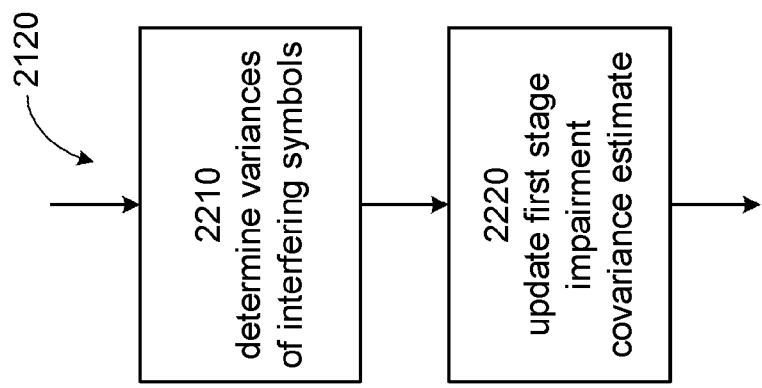
FIG. 22 illustrates a flow chart of an example process to determine second stage impairment covariance estimate.

FIG. 22 illustrates a flow chart of an example process to perform the step 2120. In step 2210, the equalizer 420 determines the variances of interfering symbols based on the previous stage interfering symbol estimates. Recall that the second stage processing 1420 can be performed once or more than once. Thus, in this context, the previous stage interfering symbol estimates are the first stage interfering symbol estimates (from step 1550) if the second stage processing 1420 has not been performed for the symbol of interest or the second stage interfering symbol estimates (from step 2150) of a previous run of the second stage processing 1420. In step 2220, the equalizer 420 updates the previous stage impairment covariance estimates based on the variances. In one aspect, the parametric update is performed as indicated by the above described equations.

In an aspect, the variances of interfering symbols are obtained based on residual interference power levels. As expressed in equation (13), the residual interference power levels are power levels of corresponding to the interfering symbols that remain after interference is canceled from the previous composite signal, which is one of the first composite signal (if this is the first performance of the second stage processing) or the second composite signal (of a previous run of the second stage processing). Note that the residual interference power levels can be obtained through computing average power values of the previous stage interfering symbol estimates of the interfering symbols.

Figure 23:
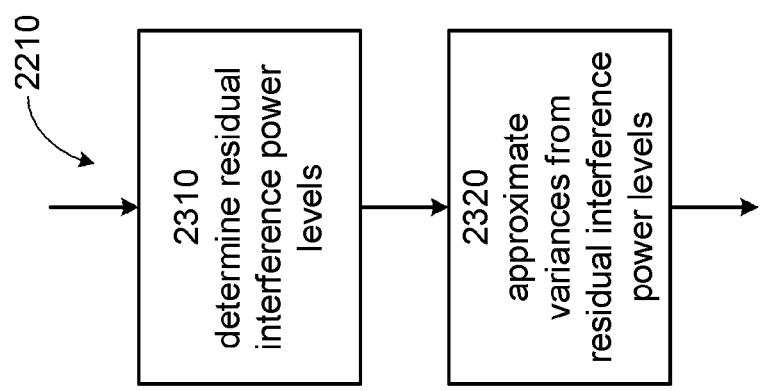
FIG. 23 illustrates a flow chart of an example process to determine variances.

FIG. 23 illustrates a flow chart of an example process to perform the step 2210 to determine the variances of the interfering symbols. In step 2310, the receiver 400, 800, 1100 determines residual powers based on the previous stage interfering symbol estimates—the first stage interfering symbol estimates (step 1550) or the second stage interfering symbol estimates (step 2150) from the previous run. These symbol estimates, which may be conditional means, can be stored in the user memories 460. In step 2320, the variances of the interfering symbols are determined based on the residual powers. Recall that the variances can be approximated from residual powers, which are powers remaining after the previous stage interferences are canceled. Thus, in one implementation of step 2330, the variances are approximated from the residual powers.

Referring back to FIG. 21, the equalizer 420 determines the second stage combining weights based on the second stage impairment covariance in step 2130. Then in step 2140, the equalizer 420 performs a second stage equalization of the second composite signal based on the second stage combining weights. The despreader/combiner 1610 embodiments illustrated in FIGS. 17A and 17B process the second composite signal much like the first composite signal is processed. The processed second composite signal can be output as the second stage equalized signal. But more preferably, both embodiments also perform add-back of soft symbol estimates of the previous stage to output a more fully equalized signal as the second equalized signal. The second combining weights can be combining weights of energy-collecting fingers only or combining weights for both energy-collecting and interference-suppression fingers.

Figure 24:
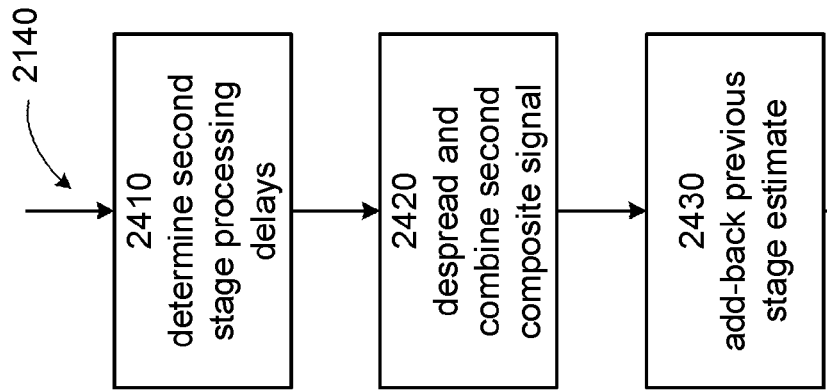
FIG. 24 illustrates a flow chart of an example process to perform a second stage equalization.

FIG. 24 illustrates a flow chart of an example process to implement step 2140 to perform the second stage equalization. In step 2410, the delay timing determiner 1620 determines the second stage processing delays in step 2410. Then in step 2420, the despreader/combiner despreads and combines the second composite signal based on the second stage combining weights. The despread and combined values can be to output as the second stage equalized signal at this point. But more preferably, add-back is performed in step 2430 and the result is output as the second stage equalized signal, which can be viewed as a stream of equalized symbols.

Referring back to FIG. 21, the receiver 400, 800, 1100 estimates one or more second stage interferences to the symbol of interest based on the second stage equalized signal in step 2150. Again, to estimate the second stage interferences, the interfering symbols are estimated. Any of the processes illustrated in FIGS. 20A, 20B and 20C may be used to estimate the second stage interferences. The demodulation/estimation steps are repeated for all symbols carried by signal $x_i$, and in doing so, the second stage estimates of symbols for symbols of interest as well as estimates of interfering symbols are generated.

Based on the second stage interferences determined in step 2150, the interference canceller 470 cancels the second stage interfering symbol estimates from the second composite signal to generate the further interference-reduced version of the first composite signal in step 2160. The process illustrated in FIG. 19 may be used to implement step 2160. Note that steps 2150 and 2160 are optional.

One significant advantage of the disclosed subject matter is it allows obtaining an updated impairment covariance matrix after soft symbol cancellation. Using the proposed method, there is no need to re-despread the unoccupied channelization codes in subsequent stages of turbo-IC operation, thus avoiding much complexity. Instead, the updated impairment covariance matrix after soft symbol cancellation can be obtained by parametrically modifying the original impairment covariance matrix obtained using the unoccupied channelization code despreading and averaging.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed in a receive node of a communication network, the receive node being structured to operate on a data stream transmitted from a transmit node, the method comprising:
    performing, by the receive node, a first stage processing a symbol of interest contained in a first composite signal; and
    performing, by the receive node, a second stage processing the same symbol of interest contained in a second composite signal,
    wherein the first stage processing comprises:
        determining a first stage impairment covariance estimate;
        determining one or more first stage combining weights based on the first stage impairment covariance estimate;
        performing a first stage equalization of the first composite signal based on the first stage combining weights to generate a first stage equalized signal;
        determining one or more first stage interfering symbol estimates based on the first stage equalized signal; and
        canceling the first stage interfering symbol estimates from the first composite signal to generate an interference-reduced version of the first composite signal, and
    wherein the second stage processing comprises:
        determining a second stage impairment covariance estimate based on the first stage impairment covariance estimate and one or more previous stage interfering symbol estimates; and
        determining one or more second stage combining weights based on the second stage impairment covariance estimate;
        performing a second stage equalization of the second composite signal based on the second stage combining weights to generate a second stage equalized signal,
    wherein the second composite signal is based on the interference-reduced version of the first composite signal, and
    wherein the previous stage corresponds to the first stage processing or to a previous run of the second stage processing.

2. The method of claim 1, wherein in the step of determining the first stage impairment covariance estimate, the first stage impairment covariance estimate is determined based on unoccupied channelization code despreading and averaging.

3. The method of claim 1, wherein the step of performing the first stage equalization of the first composite signal comprises:
    determining first stage processing delays; and
    despreading and combining the first composite signal based on the first stage processing delays and the first stage combining weights to generate the first stage equalized signal.

4. The method of claim 1,
    wherein the second stage processing further comprises determining one or more second stage interfering symbol estimates based on the second stage equalized signal,
    wherein the step of determining the second stage impairment covariance estimate comprises:
        determining variances of interfering symbols based on the previous stage interfering symbol estimates; and
        updating the first stage impairment covariance estimate based on the variances of the interfering symbols, the updated first stage impairment covariance estimate representing the second stage impairment covariance estimate, and
    wherein the previous stage interfering symbol estimates are the first stage interfering symbol estimates from the first stage processing or the second stage interfering symbol estimates from a previous run of the second stage processing.

5. The method of claim 4,
    wherein in the step of determining the variances of interfering symbols, the variances of interfering symbols are obtained based on residual interference power levels which are power levels of corresponding to the interfering symbols that remain after interference is canceled from a previous composite signal, and
    wherein the previous composite signal is the first composite signal or the second composite signal in the previous run of the second stage processing.

6. The method of claim 5, wherein the residual interference power level(s) are obtained through computing average power values of the previous stage interfering symbol estimates of the interfering symbols regenerated using likelihood indicators, wherein each likelihood indicator relates to an estimate of a corresponding interfering symbol.

7. The method of claim 6, wherein each likelihood indicator is any one or more of bit log-likelihood ratios (LLR), bit likelihood ratios, and bit probabilities of the interfering symbol corresponding to that likelihood indicator.

8. The method of claim 4, wherein the step of determining the first stage interfering symbol estimates comprises:
    demodulating the first stage equalized signal to generate first stage demodulated bit soft values;
    soft decoding the first stage demodulated bit soft values to generate first stage likelihood indicators; and
    determining the first stage interfering symbol estimates based on the first stage likelihood indicators.

9. The method of claim 8, wherein the step of determining the second stage interfering symbol estimates comprises:
    demodulating the second stage equalized signal to generate second stage demodulated bit soft values;
    soft decoding the second stage demodulated bit soft values to generate first stage likelihood indicators; and
    determining the second stage interfering symbol estimates based on the first stage likelihood indicators.

10. The method of claim 4,
    wherein the step of determining the first stage interfering symbol estimates comprises:

demodulating the first stage equalized signal to generate first stage demodulated bits or first stage likelihood indicators; and determining the first stage interfering symbol estimates based on the first stage demodulated bits or the first stage likelihood indicators, and wherein the step of determining the second stage interfering symbol estimates comprises:

demodulating the second stage equalized signal to generate second stage demodulated bits or second stage likelihood indicators; and determining the second stage interference interfering symbol estimates based on the second stage demodulated bits or the second stage likelihood indicators.

11. The method of claim 4, wherein the step of determining the first stage interfering symbol estimates comprises:

demodulating the first stage equalized signal to generate first stage demodulated bits or first stage likelihood indicators;

decoding the first stage demodulated bits or first stage likelihood indicators to generate first stage decoded information bit values;

reencoding the first stage decoded information bit values to generate first stage reencoded bit values; and determining the first stage interfering symbol estimates based on the first stage reencoded bit values.

12. The method of claim 11, wherein the step of determining the second stage interfering symbol estimates comprises:

demodulating the second stage equalized signal to generate second stage demodulated bit or second stage likelihood indicators;

decoding the second stage demodulated bits or second stage likelihood indicators to generate second stage decoded information bit values;

reencoding the second stage decoded information bit values to generate second stage reencoded bit values; and determining the second stage interfering symbol estimates based on the second stage reencoded bit values.

13. The method of claim 4, wherein the second stage processing further comprises canceling the second stage interfering symbol estimates from the second composite signal to generate further interference-reduced version of the first composite signal.

14. The method of claim 13, wherein the step of canceling the first stage interfering symbol estimates comprises:

determining a first stage signal estimate based on the first stage interfering symbol estimates; and canceling the first stage signal estimate from the first composite signal, and wherein the step of canceling the second stage interfering symbol estimates comprises:

determining a second stage signal estimate based on the second stage interfering symbol estimates; and canceling the second stage signal estimate from the second composite signal.

15. The method of claim 4, wherein the second stage combining weights are determined based on the second stage impairment covariance estimate in the step of determining the second stage combining weights.

16. The method of claim 4, wherein the previous stage interfering symbol estimates comprise hard and soft previous stage interfering symbol estimates, wherein in the previous stage, interference is canceled based on one of the hard and soft previous stage interfering symbol estimates, and wherein the second stage impairment covariance estimate is determined by updating the first stage impairment covariance estimate based on the other of the hard and soft previous stage interfering symbol estimates.

17. The method of claim 4, wherein the previous stage interfering symbol estimates comprise pre-decode and post-decode previous stage interfering symbol estimates, wherein in the previous stage, interference is canceled based on one of the pre-decode and post-decode previous stage interfering symbol estimates, and wherein the second stage impairment covariance estimate is determined by updating the first stage impairment covariance estimate based on the other of the pre-decode and post-decode previous stage interfering symbol estimates.

18. The method of claim 4, wherein the previous stage interfering symbol estimates comprise pre-decode and post-decode previous stage interfering symbol estimates, and wherein the second stage impairment covariance estimate corresponding to a data channel is determined by updating the first stage impairment covariance estimate based on the post-decode previous stage interfering symbol estimates corresponding to the data channel.

19. A receiver of a receive node of a communication network comprising a plurality of chains, each chain structured to process a symbol of interest contained in a first composite signal in a first stage, and to process the same symbol of interest contained in a second composite signal in a second stage, each chain of the receiver comprising:

an equalizer;

a demodulator;

a signal regenerator; and an interference canceller, wherein in the first stage, the equalizer is structured to determine a first stage impairment covariance estimate, to determine one or more first stage combining weights based on the first stage impairment covariance estimate, and to perform a first stage equalization of the first composite signal based on the first stage combining weights to generate a first stage equalized signal, the demodulator is structured to demodulate the first equalized signal to generate a first stage demodulated data, the signal regenerator is structured to determine one or more first stage interfering symbol estimates based on the first stage demodulated data, and the interference canceller is structured to cancel the first stage interfering symbol estimates from the first composite signal to generate an interference-reduced version of the first composite signal, wherein in the second stage, the equalizer is structured to determine a second stage impairment covariance estimate based on the first stage impairment covariance estimate and one or more previous stage interfering symbol estimates, to determine one or more second stage combining weights based on the second stage impairment covariance estimate, and to perform a second stage equalization of the second composite signal based on the second stage combining weights to generate a second stage equalized signal, wherein the second composite signal is based on the interference-reduced version of the first composite signal, and wherein the previous stage corresponds to the first stage or to a previous run of the second stage.

20. The receiver of claim 19, wherein the equalizer is structured to determine a first stage impairment covariance estimate based on unoccupied channelization code despreading and averaging.

21. The receiver of claim 19, wherein the equalizer is structured to determine the first stage processing delays, and despread and combine the first composite signal based on the first stage processing delays and the first stage combining weights to generate the first stage equalized signal.

22. The receiver of claim 19,
wherein the signal regenerator is structured to determine one or more second stage interfering symbol estimates based on the second stage equalized signal,
wherein the equalizer is structured to determine variances of interfering symbols based on the previous stage interfering symbol estimates, and to update the first stage impairment covariance estimate based on the variances of the interfering symbols, the updated first stage impairment covariance estimate representing the second stage impairment covariance estimate, and
wherein the previous stage interfering symbol estimates are the first stage interfering symbol estimates from the first stage or the second stage interfering symbol estimates from a previous run of the second stage.

23. The receiver of claim 22,
wherein the equalizer is structured to determine the variances of interfering symbols based on residual interference power levels which are power levels of corresponding to the interfering symbols that remain after interference is canceled from a previous composite signal, and
wherein the previous composite signal is the first composite signal or the second composite signal in the previous run of the second stage processing.

24. The receiver of claim 23, wherein the equalizer is structured to determine the residual interference power level through computing average power values of the previous stage interfering symbol estimates of the interfering symbols regenerated using likelihood indicators, wherein each likelihood indicator relates to an estimate of a corresponding interfering symbol.

25. The receiver of claim 24, wherein each likelihood indicator is any one or more of bit log-likelihood ratios (LLR), bit likelihood ratios, and bit probabilities of the interfering symbol corresponding to that likelihood indicator.

26. The receiver of claim 22, further comprising a decoder,
wherein the demodulator is structured to demodulate the first stage equalized signal to generate first stage demodulated bit soft values, wherein the decoder is structured to soft decode the first stage demodulated bit soft values to generate first stage likelihood indicators, and
wherein the signal regenerator is structured to generate the first stage interfering symbol estimates based on the first stage likelihood indicators.

27. The receiver of claim 26,
wherein the demodulator is structured to demodulate the second stage equalized signal to generate second stage demodulated bit soft values,
wherein the decoder is structured to soft decode the second stage demodulated bit soft values to generate second stage likelihood indicators, and
wherein the signal regenerator is structured to generate the second stage interfering symbol estimates based on the second stage likelihood indicators.

28. The receiver of claim 22,
wherein the demodulator is structured to demodulate the first stage equalized signal to generate first stage demodulated bits or first stage likelihood indicators, and structured to demodulate the second stage equalized signal to generate second stage demodulated bits or second stage likelihood indicators, and
wherein the signal regenerator is structured to generate the first stage interfering symbol estimates based on the first stage demodulated bits or the first stage likelihood indicators and structured to generate the second stage interfering symbol estimates based on the second stage demodulated bits or second stage likelihood indicators.

29. The receiver of claim 22, further comprising a decoder,
wherein the demodulator is structured to demodulate the first stage equalized signal to generate first stage demodulated bits or first stage likelihood indicators,
wherein the decoder is structured to decode the first stage demodulated bits or the first stage likelihood indicators to generate first stage decoded bit hard values, and
wherein the signal regenerator is structured to reencode the first stage decoded bit hard values to generate first stage reencoded bit values, and to determine the first stage interfering symbol estimates based on the first stage reencoded bit values.

30. The receiver of claim 29,
wherein the demodulator is structured to demodulate the second stage equalized signal to generate second stage demodulated bits or second stage likelihood indicators,
wherein the decoder is structured to decode the second stage demodulated bits or the second stage likelihood indicators to generate second stage decoded information bit values, and
wherein the signal regenerator is structured to reencode the second stage decoded information bit values to generate second stage reencoded bit values, and to determine the second stage interfering symbol estimates based on the second stage reencoded bit values.

31. The receiver of claim 22, wherein in the second stage, the interference canceller is structured to cancel the second stage interfering symbol estimates from the second composite signal to generate further interference-reduced version of the first composite signal.

32. The receiver of claim 31,
wherein the signal regenerator is structured to determine a first stage signal estimate based on the first stage interfering symbol estimates, and structured to determine a second stage signal estimate based on the second stage interfering symbol estimates, and
wherein the interference canceller is structured to cancel the first stage signal estimate from the first composite signal, and structured to cancel the second stage signal estimate from the second composite signal.

33. The receiver of claim 22, wherein the equalizer is structured to determine the second stage combining weights based on the second stage impairment covariance estimate.

34. The receiver of claim 22,
wherein the previous stage interfering symbol estimates comprise hard and soft previous stage interfering symbol estimates,
wherein in the previous stage, the interference canceller is structured to cancel interference based on one of the hard and soft previous stage interfering symbol estimates, and
wherein the equalizer is structured to update the first stage impairment covariance estimate based on the other of the hard and soft previous stage interfering symbol estimates as the second stage impairment covariance estimate.

35. The receiver of claim 22,
wherein the previous stage interfering symbol estimates comprise pre-decode and post-decode previous stage interfering symbol estimates,
wherein in the previous stage, the interference canceller is structured to cancel interference based on one of the pre-decode and post-decode previous stage interfering symbol estimates, and
wherein the equalizer is structured to update the first stage impairment covariance estimate based on the other of the pre-decode and post-decode previous stage interfering symbol estimates as the second stage impairment covariance estimate.

36. The receiver of claim 22,
wherein the previous stage interfering symbol estimates comprise pre-decode and post-decode previous stage interfering symbol estimates,
wherein the equalizer is structured to update the first stage impairment covariance estimate based on the post-decode previous stage interfering symbol estimates corresponding to the data channel as the second stage impairment covariance estimate.

37. A non-transitory computer readable medium containing therein a program executable by a computer in a receive node of a communication network, when executed, the program causing the computer to perform a first stage processing a symbol of interest contained in a first composite signal, and to perform a second stage processing the same symbol of interest contained in a second composite signal,
wherein the first stage processing comprises:
determining a first stage impairment covariance estimate;
determining one or more first stage combining weights based on the first stage impairment covariance estimate;
performing a first stage equalization of the first composite signal based on the first stage combining weights to generate a first stage equalized signal;
determining one or more first stage interfering symbol estimates based on the first stage equalized signal; and
canceling the first stage interfering symbol estimates from the first composite signal to generate an interference-reduced version of the first composite signal, and
wherein the second stage processing comprises:
determining a second stage impairment covariance estimate based on the first stage impairment covariance estimate and one or more previous stage interfering symbol estimates; and
determining one or more second stage combining weights based on the second stage impairment covariance estimate;
performing a second stage equalization of the second composite signal based on the second stage combining weights to generate a second stage equalized signal,
wherein the second composite signal is based on the interference-reduced version of the first composite signal, and
wherein the previous stage corresponds to the first stage processing or to a previous run of the second stage processing.

38. The non-transitory computer readable medium of claim 37,
wherein the second stage processing further comprises determining one or more second stage interfering symbol estimates based on the second stage equalized signal,
wherein the step of determining the second stage impairment covariance estimate comprises:
determining variances of interfering symbols based on the previous stage interfering symbol estimates; and
updating the first stage impairment covariance estimate based on the variances of the interfering symbols, the updated first stage impairment covariance estimate representing the second stage impairment covariance estimate, and
wherein the previous stage interfering symbol estimates are the first stage interfering symbol estimates from the first stage processing or the second stage interfering symbol estimates from a previous run of the second stage processing.

* * * * *

UNITED STATES PATENT AND TRADEMARK OFFICE
CERTIFICATE OF CORRECTION

PATENT NO. : 8,761,323 B2
APPLICATION NO. : 13/333478
DATED : June 24, 2014
INVENTOR(S) : Wang et al.

It is certified that error appears in the above-identified patent and that said Letters Patent is hereby corrected as shown below:

In the Specification

In Column 10, Line 55, delete "symbols" and insert -- symbol --, therefor.

In Column 19, Lines 8-9, delete "receive node 210." and insert -- receive node 230. --, therefor.

Signed and Sealed this
Nineteenth Day of May, 2015

Michelle K. Lee
*Director of the United States Patent and Trademark Office*